United States Patent
Hamano et al.

(10) Patent No.: US 9,606,735 B2
(45) Date of Patent: Mar. 28, 2017

(54) STORAGE MANAGEMENT APPARATUS, AND PERFORMANCE ADJUSTING METHOD

(71) Applicant: FUJITSU LIMITED, Kawasaki-shi, Kanagawa (JP)

(72) Inventors: Shinya Hamano, Numazu (JP); Toshiharu Makida, Numazu (JP); Kiyoshi Sugioka, Mishima (JP); Motohiro Sakai, Nerima (JP)

(73) Assignee: FUJITSU LIMITED, Kawasaki (JP)

( * ) Notice: Subject to any disclaimer, the term of this patent is extended or adjusted under 35 U.S.C. 154(b) by 94 days.

(21) Appl. No.: 14/632,425

(22) Filed: Feb. 26, 2015

(65) Prior Publication Data
US 2015/0277767 A1    Oct. 1, 2015

(30) Foreign Application Priority Data
Mar. 28, 2014    (JP) .................................. 2014-070511

(51) Int. Cl.
*G06F 3/06* (2006.01)

(52) U.S. Cl.
CPC ............ *G06F 3/061* (2013.01); *G06F 3/0605* (2013.01); *G06F 3/0631* (2013.01);
(Continued)

(58) Field of Classification Search
CPC ...... G06F 3/0605; G06F 3/061; G06F 3/0631; G06F 3/06; G06F 3/0601; G06F 3/0628;
(Continued)

(56) References Cited

U.S. PATENT DOCUMENTS

| | | | |
|---|---|---|---|
| 2004/0123180 A1* | 6/2004 | Soejima | G06F 11/1096 714/5.1 |
| 2007/0050684 A1* | 3/2007 | Takaoka | G06F 3/061 714/47.2 |

(Continued)

FOREIGN PATENT DOCUMENTS

| | | |
|---|---|---|
| EP | 0801344 A2 | 10/1997 |
| EP | 2302500 A2 | 3/2011 |

(Continued)

OTHER PUBLICATIONS

Extended European Search Report dated Aug. 4, 2015 for corresponding European Patent Application No. 15155939.0, 8 pages.
*Please note JP-2012-509538-A and JP-2008-27233-A cited herein, were previously cited in an IDS filed on Feb. 26, 2015.*.

*Primary Examiner* — Shawn X Gu
*Assistant Examiner* — Jean Edouard
(74) *Attorney, Agent, or Firm* — Fujitsu Patent Center

(57) ABSTRACT

An operational management server manages a storage device that includes a plurality of types of disks having different performances. A setting unit sets a target value of a performance to a volume produced by using the different types of the disks. An allocation rate management unit determines allocation rates of the respective types of the disks included in the volume on the basis of the target value set by the setting unit, and instructs the storage device to reproduce the volume in accordance with the determined allocation rates.

14 Claims, 22 Drawing Sheets

(52) U.S. Cl.
CPC .......... *G06F 3/0635* (2013.01); *G06F 3/0653* (2013.01); *G06F 3/0665* (2013.01); *G06F 3/0689* (2013.01)

(58) Field of Classification Search
CPC ........ G06F 3/0629; G06F 13/10; G06F 12/02; G06F 9/50; G06F 11/2071; G06F 11/2069; G06F 9/5016
See application file for complete search history.

(56) References Cited

U.S. PATENT DOCUMENTS

| | | | |
|---|---|---|---|
| 2007/0078901 A1* | 4/2007 | Satou | G06F 3/0605 |
| 2007/0183179 A1* | 8/2007 | Maeda | G06F 3/061 |
| | | | 365/52 |
| 2007/0294314 A1* | 12/2007 | Padovano | G06F 11/2079 |
| 2010/0088469 A1* | 4/2010 | Motonaga | G06F 3/0613 |
| | | | 711/113 |
| 2010/0235585 A1* | 9/2010 | Dowlatkhah | G06F 17/30566 |
| | | | 711/136 |
| 2011/0072225 A1 | 3/2011 | Kawaguchi et al. | |
| 2011/0099343 A1* | 4/2011 | Ozdemir | G06F 11/2082 |
| | | | 711/162 |
| 2012/0011320 A1* | 1/2012 | Maki | G06F 9/5016 |
| | | | 711/114 |
| 2012/0109897 A1* | 5/2012 | Janakiraman | G06F 11/1466 |
| | | | 707/660 |
| 2013/0067159 A1* | 3/2013 | Mehra | G06F 3/0605 |
| | | | 711/114 |
| 2013/0212349 A1 | 8/2013 | Maruyama | |
| 2013/0246706 A1* | 9/2013 | Matsumura | G06F 8/65 |
| | | | 711/114 |
| 2014/0297987 A1* | 10/2014 | Garson | G06F 12/023 |
| | | | 711/170 |

FOREIGN PATENT DOCUMENTS

| | | |
|---|---|---|
| JP | 2008-027233 | 2/2008 |
| JP | 2011-070628 | 4/2011 |
| JP | 2012-506087 | 3/2012 |
| JP | 2012-509538 | 4/2012 |
| JP | 2013-164822 | 8/2013 |
| WO | 2010/044766 | 4/2010 |
| WO | 2010/059172 | 5/2010 |

* cited by examiner

| VOLUME IDENTIFYING INFORMATION | TARGET RESPONSE TIME |
|---|---|
| Storage=1, VolNo=1 | 10 ms |
| Storage=1, VolNo=2 | – |
| Storage=2, VolNo=1 | 20 ms |
| Storage=2, VolNo=2 | – |

| ACCESS FREQUENCY RATE | HIT RATE |
|---|---|
| 20% | 50% |
| 40% | 75% |
| 60% | 87.5% |
| 80% | 93.75% |

| TYPE OF DISK | TYPE OF I/O | TYPE OF RAID | RESPONSE TIME |
|---|---|---|---|
| HIGH SPEED | READ | RAID1 | 1.0 ms |
| | | RAID5 | 1.0 ms |
| | WRITE | RAID1 | 1.0 ms |
| | | RAID5 | 1.5 ms |
| MEDIUM SPEED | READ | RAID1 | 5.0 ms |
| | | RAID5 | 5.0 ms |
| | WRITE | RAID1 | 6.0 ms |
| | | RAID5 | 6.5 ms |
| LOW SPEED | READ | RAID1 | 10 ms |
| | | RAID5 | 10 ms |
| | WRITE | RAID1 | 11 ms |
| | | RAID5 | 12 ms |

| TASK CONTENT | READ RATIO | WRITE RATIO |
|---|---|---|
| FOR WEB | 9 | 1 |
| DB USE (MAINLY FOR REFERENCE) | 7 | 3 |
| DB USE (MAINLY FOR UPDATING) | 3 | 7 |
| BACKUP (ORIGINAL) | 10 | 0 |
| BACKUP | 0 | 10 |

| TYPE OF DISK | TYPE OF I/O | TYPE OF RAID | NUMBER OF BASIC PERFORMANCE DISKS | BASIC PERFORMANCE IOPS | CO-EFFICIENT |
|---|---|---|---|---|---|
| HIGH SPEED | READ | RAID10 | 1 | 200 | n1 |
| | | RAID5 | 2 | 400 | n2 |
| | | RAID6 | 2 | 400 | n3 |
| | WRITE | RAID10 | 1 | 100 | n4 |
| | | RAID5 | 2 | 120 | n5 |
| | | RAID6 | 2 | 100 | n6 |
| MEDIUM SPEED | READ | RAID10 | 1 | 100 | n7 |
| | | RAID5 | 2 | 200 | n8 |
| | | RAID6 | 2 | 200 | n9 |
| | WRITE | RAID10 | 1 | 50 | n10 |
| | | RAID5 | 2 | 60 | n11 |
| | | RAID6 | 2 | 50 | n12 |
| LOW SPEED | READ | RAID10 | 1 | 50 | n13 |
| | | RAID5 | 2 | 100 | n14 |
| | | RAID6 | 2 | 100 | n15 |
| | WRITE | RAID10 | 1 | 20 | n16 |
| | | RAID5 | 2 | 25 | n17 |
| | | RAID6 | 2 | 20 | n18 |

FIG.10

| TYPE OF DISK | TYPE OF I/O | TYPE OF RAID | NUMBER OF BASIC PERFORMANCE DISKS | BASIC PERFORMANCE THROUGHPUT [MB/s] | CO-EFFICIENT |
|---|---|---|---|---|---|
| HIGH SPEED | READ | RAID10 | 1 | 150 | m1 |
| | | RAID5 | 2 | 150 | m2 |
| | | RAID6 | 2 | 150 | m3 |
| | WRITE | RAID10 | 1 | 90 | m4 |
| | | RAID5 | 2 | 85 | m5 |
| | | RAID6 | 2 | 85 | m6 |
| MEDIUM SPEED | READ | RAID10 | 1 | 100 | m7 |
| | | RAID5 | 2 | 100 | m8 |
| | | RAID6 | 2 | 100 | m9 |
| | WRITE | RAID10 | 1 | 50 | m10 |
| | | RAID5 | 2 | 48 | m11 |
| | | RAID6 | 2 | 45 | m12 |
| LOW SPEED | READ | RAID10 | 1 | 80 | m13 |
| | | RAID5 | 2 | 80 | m14 |
| | | RAID6 | 2 | 80 | m15 |
| | WRITE | RAID10 | 1 | 40 | m16 |
| | | RAID5 | 2 | 38 | m17 |
| | | RAID6 | 2 | 37 | m18 |

| CHUNK NAME | NUMBER OF ACCESSES |
|---|---|
| CHUNK #1 | 100 TIMES |
| CHUNK #2 | 200 TIMES |
| CHUNK #3 | 300 TIMES |
| CHUNK #4 | 400 TIMES |
| TOTAL | 1000 TIMES |

FIG.13

| CHUNK NAME | HIT RATE |
|---|---|
| CHUNK #1 | 40% |
| CHUNK #2 | 30% |
| CHUNK #3 | 20% |
| CHUNK #4 | 10% |

| ACCESS FREQUENCY RATE | HIT RATE |
|---|---|
| 25% | 40% |
| 50% | 70% |
| 70% | 90% |
| 100% | 100% |

| TYPE OF DISK | IOPS | |
| | MAXIMUM | CORRECTED |
|---|---|---|
| LOW SPEED DISK | 500 | NO |
| MEDIUM SPEED DISK | 900 | NO |
| HIGH SPEED DISK | 1500 | YES |

| TARGET RESPONSE TIME/ ACTUAL MEASURED RESPONSE TIME | HIT RATE |
|---|---|
| SMALLER THAN 0.01 | 50% |
| EQUAL TO OR LARGER THAN 0.01 AND SMALLER THAN 0.03 | 30% |
| EQUAL TO OR LARGER THAN 0.03 AND SMALLER THAN 0.1 | 10% |
| EQUAL TO OR LARGER THAN 0.1 AND SMALLER THAN 1 | 3% |
| EQUAL TO OR LARGER THAN 1 AND SMALLER THAN 10 | 3% |
| EQUAL TO OR LARGER THAN 10 AND SMALLER THAN 30 | 10% |
| EQUAL TO OR LARGER THAN 30 AND SMALLER THAN 100 | 30% |
| EQUAL TO OR LARGER THAN 100 | 50% |

| VOLUME | ADDRESS | RAID GROUP SERVING AS ALLOCATION DESTINATION | ADDRESS |
|---|---|---|---|
| Storage=1, VolNo=1 | 0000 TO 000F | RAIDG-2 | 0000 TO 000F |
| | 0010 TO 001F | RAIDG-4 | 0030 TO 003F |
| | 0020 TO 002F | RAIDG-2 | 0010 TO 001F |
| Storage=2, VolNo=1 | 0000 TO 000F | RAIDG-3 | 00F0 TO 00FF |
| | 0010 TO 001F | RAIDG-1 | 0000 TO 000F |

| RAID GROUP | POOL NUMBER |
|---|---|
| RAIDG-2 | ##0 |
| RAIDG-4 | ##0 |
| RAIDG-2 | ##1 |
| RAIDG-3 | ##2 |
| RAIDG-1 | ##2 |

| POOL NUMBER | POOL NAME | TYPE |
|---|---|---|
| ##0 | PoolH1 | HIGH SPEED |
| ##1 | PoolM1 | MEDIUM SPEED |
| ##2 | PoolL1 | LOW SPEED |
| ##3 | PoolH2 | HIGH SPEED |
| ##4 | PoolM2 | MEDIUM SPEED |

| VOLUME | CHUNK NAME | TYPE | POOL NAME |
|---|---|---|---|
| Storage=1, VolNo=1 | CHUNK #1 | HIGH SPEED | PoolH1 |
| | CHUNK #2 | MEDIUM SPEED | PoolM1 |
| | CHUNK #3 | LOW SPEED | PoolL1 |
| Storage=2, VolNo=1 | CHUNK #4 | HIGH SPEED | PoolH2 |
| | CHUNK #5 | MEDIUM SPEED | PoolM2 |

FIG.23

| CHUNK NAME | NUMBER OF ACCESSES | | | | | |
|---|---|---|---|---|---|---|
| | 10:10 | 10:20 | 10:30 | 10:40 | 10:50 | 11:00 |
| CHUNK #1 | 50 | 50 | 50 | 50 | 50 | 50 |
| CHUNK #2 | 0 | 80 | 80 | 0 | 0 | 80 |
| CHUNK #3 | 10 | 20 | 30 | 40 | 50 | 60 |

FIG.27
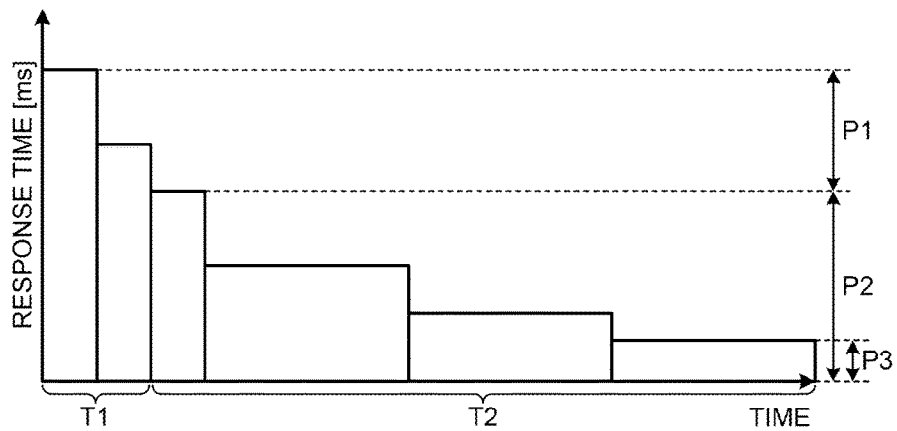
FIG.28
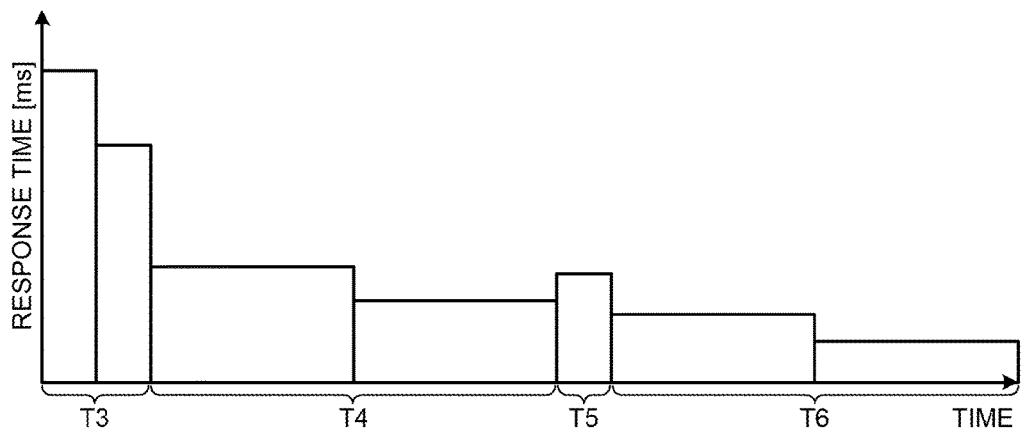
FIG.29
|  | HIGH SPEED DISK | MEDIUM SPEED DISK | LOW SPEED DISK |
|---|---|---|---|
| HIGH PERFORMANCE | 2 | 1 | 0.5 |
| MEDIUM PERFORMANCE | 1 | 2 | 1 |
| LOW PERFORMANCE | 0.5 | 1 | 2 |

STORAGE MANAGEMENT APPARATUS, AND PERFORMANCE ADJUSTING METHOD

CROSS-REFERENCE TO RELATED APPLICATION

This application is based upon and claims the benefit of priority of the prior Japanese Patent Application No. 2014-070511, filed on Mar. 28, 2014, the entire contents of which are incorporated herein by reference.

FIELD

The embodiments discussed herein are directed to a storage management apparatus, a performance adjusting method, and a performance adjusting program.

BACKGROUND

Recently, virtualization of open systems and servers has been popularized, thereby complicating management of systems. In view of making it easier to manage the systems and of flexibly coping with a rapid increase in data capacity, storage systems have been commonly introduced.

In such storage systems, disks having different speeds can be used. Examples of the disks include a solid state disk (SSD), a serial attached small computer interface hard disk drive (SASHDD), and a serial advanced technology attachment (SATA) HDD.

In such a storage system, a storage area called a volume is created in some cases using a plurality of types of disks having different speeds included in the storage system. Automatic storage layering techniques have been widely used in which a storage area of data in the disks having different speeds in the volume is determined in accordance with a frequency of use of the data.

When the automatic disk layering technique is used, frequently used data is stored in a disk having a high speed in the volume while less frequently used data is stored in a disk having a low speed in the volume, for example. The automatic storage layering can achieve a storage device having a high speed and high capacity at low cost.

In an example of a storage performance adjusting technique, a limitation of a bandwidth of a data transfer path between the volume and a server that executes applications is adjusted. This function is called a quality of service (QoS) in some times.

In an example of the conventional automatic storage layering technique, a tier level is changed on the basis of a state of an application that accesses data in the volume. In another conventional technique, a virtual volume is clustered and segments are restructured by comparing measured loads of the respective clusters with a frequency of use of the virtual volume. In still another conventional technique, a location of data is determined on the basis of whether a target value is satisfied in a storage area to which the target value of a service level is allocated.

Patent Document 1: Japanese Laid-open Patent Publication No. 2011-70628
Patent Document 2: Japanese National Publication of International Patent Application No. 2012-509538 Patent Document 3: Japanese Laid-open Patent Publication No. 2008-27233

In the conventional automatic storage layering, input output per second (IOPS) thresholds and allocation rates of the disks in the volume are used as evaluation indicators. It is, thus, difficult for an operator to appropriately set the values. In the automatic storage layering, the IOPS is often used as the evaluation indicator of performance adjustment, for example. In the use of the QoS function, a response time is often used as the evaluation indicator of the performance adjustment. As a result, when performing the performance adjustment using both of the automatic storage layering function and the QoS function, the operator of the storage sets evaluation indicators that differ from each other for the respective functions. Both of the automatic layering function and the QoS function are functions that adjust the performance of the storage. It is thus cumbersome for the operator to use the respective functions in a different manner in the performance adjustment.

For the conventional technique in which the tier level is changed on the basis of the state of an application, it is difficult to readily perform the performance adjustment because setting a performance target and adjusting an actual measured performance in accordance with the performance target have not been taken into consideration. For the conventional technique in which a measured load serving as a performance indicator is compared with the frequency of use of the virtual volume and the segments are re-constructed, it is difficult to readily perform the performance adjustment because setting a target value and causing the actual measured performance to get close to the target value have not been taken into consideration. In the conventional technique in which the location of data is determined on the basis of whether the target value of the service level is satisfied, the data is stored when the target value is satisfied. It is, however, difficult to perform performance adjustment such that an actual measured performance gets close to the set target value.

SUMMARY

According to an aspect of an embodiment, a storage management apparatus that manages a storage device including a plurality of types of storage units having different performances includes: a setting unit that sets a target value of a performance to a storage area produced by using the different types of the storage units; and an allocation rate management unit that determines allocation rates of the respective types of the storage units included in the storage area on the basis of the target value set by the setting unit, and instructs the storage device to reproduce the storage area in accordance with the determined allocation rates.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a table illustrating an example of a setting table;
FIG. 5 is a schematic diagram illustrating an example of an access distribution function;
FIG. 6 is a schematic diagram illustrating an example of response time information;

FIG. 7 is a schematic diagram illustrating an example of read/write ratio information;

FIG. 9 is a schematic diagram illustrating an example of input output per second (IOPS) information;

FIG. 10 is a schematic diagram illustrating an example of throughput information;

FIG. 12 is a spreadsheet illustrating an example of an access number spreadsheet;

FIG. 13 is a schematic diagram illustrating an example of hit rates of respective chunks;

FIG. 14 is a schematic diagram illustrating an example of the access distribution function produced by an allocation rate management unit;

FIG. 15 is a table illustrating an example of an IOPS information table;

FIG. 19 is a schematic diagram illustrating an example of increase-decrease amount information;

FIG. 21A is a schematic diagram illustrating an example of chunk mapping information;

FIG. 21B is a schematic diagram illustrating an example of RAID group correspondence information;

FIG. 21C is a schematic diagram illustrating an example of pool information;

FIG. 22 is a schematic diagram illustrating an example of chunk information;

FIG. 23 is a schematic diagram illustrating an example of chunk access information;

FIG. 27 is a schematic diagram illustrating operation timing of a quality of service (QoS) function and an automatic layering function;

FIG. 28 is a schematic diagram illustrating another example of the operation timing of the QoS function and the automatic layering function; and FIG. 29 is a table illustrating an example of an allocation rate weight correspondence table.

DESCRIPTION OF EMBODIMENTS

Preferred embodiments of the present invention will be explained with reference to accompanying drawings. The following embodiments do not limit the storage management apparatus, the performance adjusting method, and the performance adjusting program disclosed by the invention.

[a] First Embodiment

Figure 1:
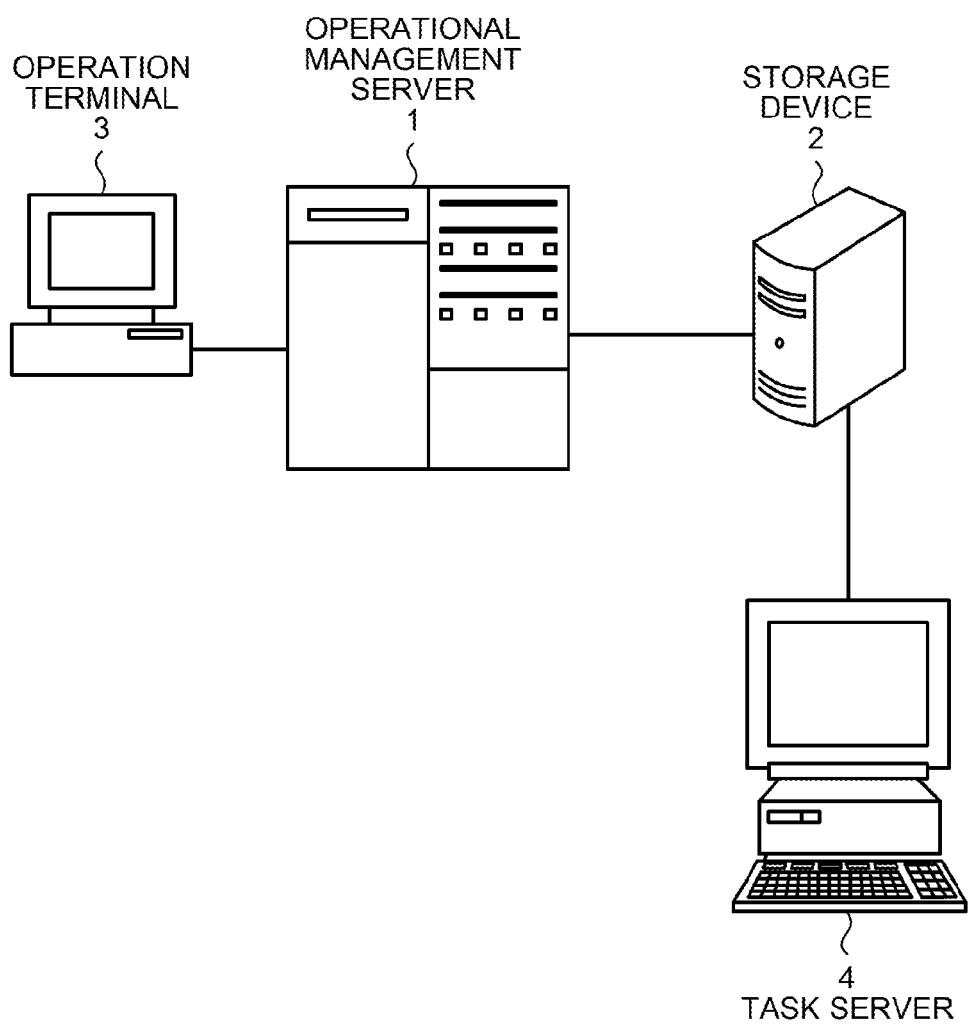
FIG. 1 is a schematic structural view of a storage system according to a first embodiment.

FIG. 1 is a schematic structural view of a storage system according to a first embodiment. As illustrated in FIG. 1, the storage system according to the first embodiment includes an operational management server 1, a storage device 2, an operation terminal 3, and a task server 4. FIG. 1 illustrates the storage device 2. The number of storage devices 2 is, however, not limited to a specific number. FIG. 1 illustrates the task server 4. The number of task servers 4 is also, however, not limited to a specific number.

The operation terminal 3 is connected to the operational management server 1 via a network. The operation terminal 3 transmits, to the operational management server 1, an instruction to cause the storage device 2 to perform processing, for example. The operation terminal 3 also displays a message transmitted from the operational management server 1 on a display so as to notify an operator of the message, for example.

The operational management server 1 operates and manages the storage device 2. The operational management server 1 executes a quality of service (QoS) control program and a storage management program. The operational management server 1 is an example of the "storage management apparatus".

Specifically, the operational management server 1 controls the QoS in the storage device 2, for example. The QoS is a performance setting function to cause the storage device 2 to maintain a stable performance. For example, the QoS adjusts a volume bandwidth, which is described later. The operational management server 1 also controls the storage device 2 in accordance with a command that is input via the operation terminal 3. For example, the operational management server 1 instructs the storage device 2 to form a redundant array of inexpensive disks (RAID) in accordance with the instruction that is input via the operation terminal 3.

The storage device 2 receives an instruction from an application running on the task server 4, and reads or writes data using the QoS. The storage device 2 receives an instruction to adjust the bandwidth of the volume from the operational management server 1 and controls the QoS.

The task server 4 executes a task application. The task server 4 is called a host in some cases. When executing an application, the task server 4 reads data from or writes data into the storage device 2. Any application that exchanges data between the task server 4 and the storage device 2 can be used as the application executed by the task server 4.

Figure 2:
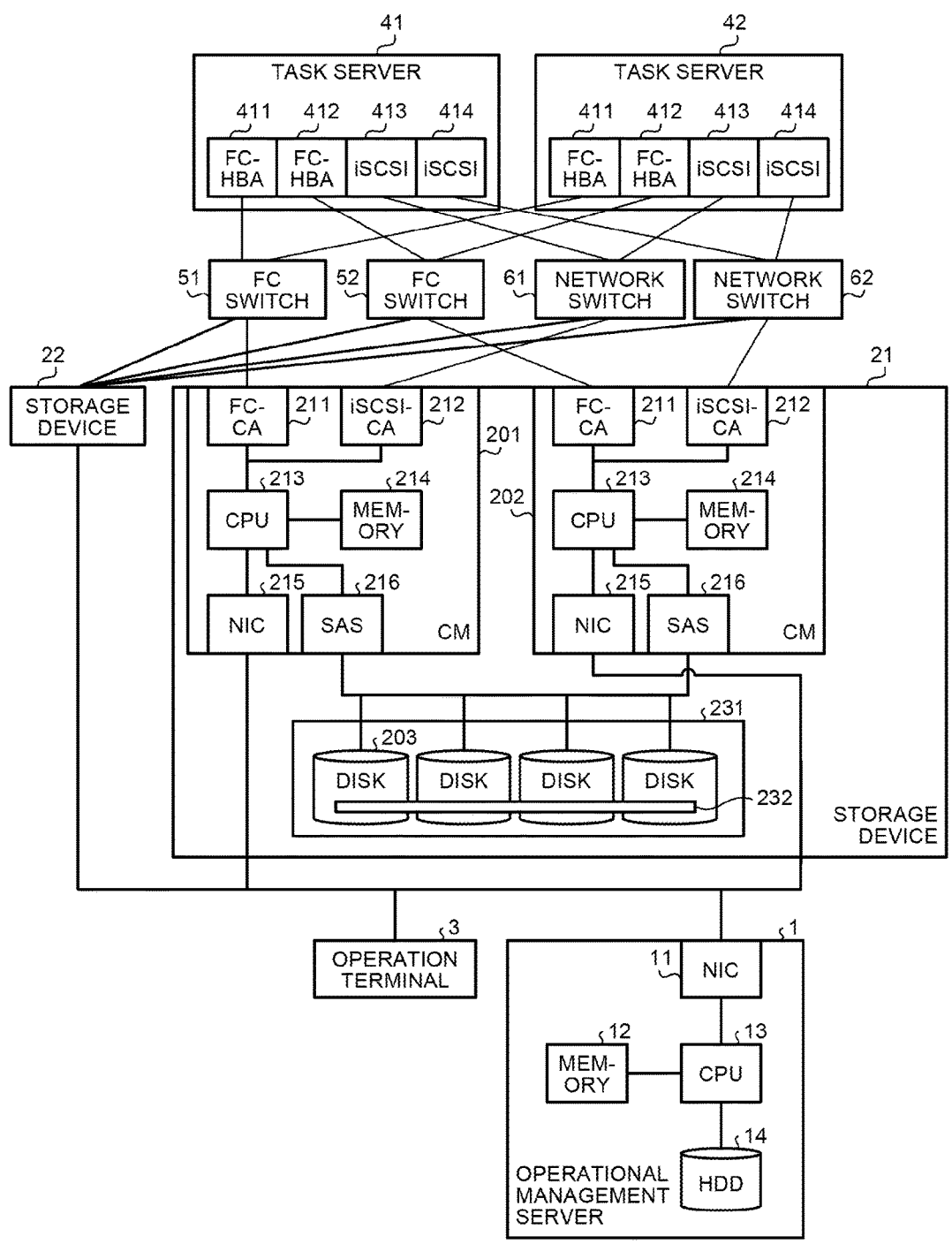
FIG. 2 is a hardware structural view of the storage system.

FIG. 2 is a hardware structural view of the storage system. As illustrated in FIG. 2, storage devices 21 and 22 are arranged as the storage device 2. As illustrated in FIG. 2, task servers 41 and 42 are arranged as the task server 4.

The task server 4 includes fiber channel-host bus adaptors (FC-HBAs) 411 and 412, and internet small computer system interfaces (iSCSIs) 413 and 414. In the embodiment, the task server 4 includes FC-HBAs 411 and 412. The number of FC-HBAs included in the task server 4 is not limited to a specific number. In the embodiment, the task server 4 includes iSCSIs 413 and 414. The number of iSCSIs included in the task server 4 is not limited to a specific number.

The FC-HBAs 411 and 412 are communication interfaces of data communication using fiber channels. The FC-HBA 411 is connected to an FC switch 51 while the FC-HBA 412 is connected to an FC switch 52.

The iSCSIs 413 and 414 are communication interfaces of data communication compliant with iSCSI standards. The iSCSI 413 is connected to a network switch 61 while the iSCSI 414 is connected to a network switch 62.

The FC switches 51 and 52 relay the communication using fiber channels between the storage device 2 and the task server 4. The FC switch 51 connects the FC-HBA 411 and an FC channel adapter (FC-CA) 211 while the FC switch 52 connects the FC-HBA 412 and the FC-CA 211.

The network switches 61 and 62 relay the communication using the iSCSI between the storage device 2 and the task server 4. The network switch 61 connects the iSCSI 413 and an iSCSI-CA 212 while the network switch 62 connects the iSCSI 414 and the iSCSI-CA 212.

The storage device 2 includes controller modules (CMs) 201 and 202, and disks 203.

The CMs 201 and 202 have the same function. In the following description, the CM 201 is described as an example.

The CM 201 includes the FC-CA 211, the iSCSI-CA 212, a central processing unit (CPU) 213, a memory 214, a network interface card (NIC) 215, and a serial attached SCSI (SAS) 216.

The FC-CA 211, the iSCSI-CA 212, the memory 214, the NIC 215, and the SAS 216 are connected to the CPU 213.

The CPU 213 exchanges data with the task server 4 via the FC-CA 211 and the iSCSI-CA 212.

The CPU 213 reads data from and writes data into the disks 203 via the SAS 216.

The CPU 213 communicates with the operation terminal 3 and the operational management server 1 via the NIC 215. For example, when receiving an instruction to adjust the bandwidth, which is described later, from the operational management server 1, the CPU 213 adjusts the bandwidths of the disks 203 in accordance with the instruction.

The storage device 2 is provided with the multiple disks 203. The disks 203 have different speeds. In the embodiment, the disks are classified into three types of disks having different speeds, i.e., a high speed disk, a medium speed disk, and a low speed disk.

As illustrated in FIG. 2, the disks 203 having different speeds form a RAID group 231. A physical storage area of the RAID group 231 is allocated to a storage area of a volume 232. The volume 232 is a logical volume that the task server 4 accesses. The destination to which the volume 232 is physically allocated includes the three types of the disks 203 having different speeds. The performance adjustment is performed on the logical volume 232 by changing allocation rates of the respective types of the disks 203. The volume 232 is thus automatically layered.

The respective types of the disks 203 included in the automatic layered volume 232 are divided into areas each having a fixed size. In the following description, the area having the fixed size is called a "chunk". The performance adjustment is performed on the automatic layered volume 232 by allocating the number of chunks corresponding to the respective allocation rates from the respective types of the disks 203.

The following describes writing and reading of data performed by the CPU 213. The CPU 213 receives, from the task application running on the task server 4, a read command to read data and a write command to write data. The read command and the write command are transmitted to the CPU 213 via a port of the FC switch 51 and a port of the FC-CA 211, for example. The CPU 213 reads data from or writes data into the volume 232 of the disks 203 in accordance with the received command. The data is read from or written into the volume 232 in accordance with the configuration of the RAID group 231. The processing of reading and writing of data performed by the CPU 213 of the CM 201 is described above. The CPU 213 of the CM 202 also performs the processing in the same manner as the CPU 213 of the CM 201.

In the data transfer such as the writing and reading of data, a conflict occurs in the ports of the FC switch 51, the FC-CA 211, and the iSCSI-CA 212, the CPU 213 serving as the processor of data processing, and the RAID group 231. In the following description, the ports of the FC switch 51, the FC-CA 211, and the iSCSI-CA 212, the CPU 213 serving as the processor of data processing, and the RAID group 231 may be referred to as "resources" in some cases.

If a conflict occurs in any of the resources in data transfer, the performance of the data transfer deteriorates. The conflict in a certain resource can be resolved by adjusting the bandwidth of the volume 232 that uses the transmission path using the resource where the conflict occurs, thereby making it possible to maintain the performance of the data transfer at a high level. The following describes the adjusting of the bandwidth of the volume 232.

The operational management server 1 includes a NIC 11, a memory 12, a CPU 13 and a hard disk drive (HDD) 14. The NIC 11, the memory 12, and the HDD 14 are connected to the CPU 13 via a bus.

Figure 3:
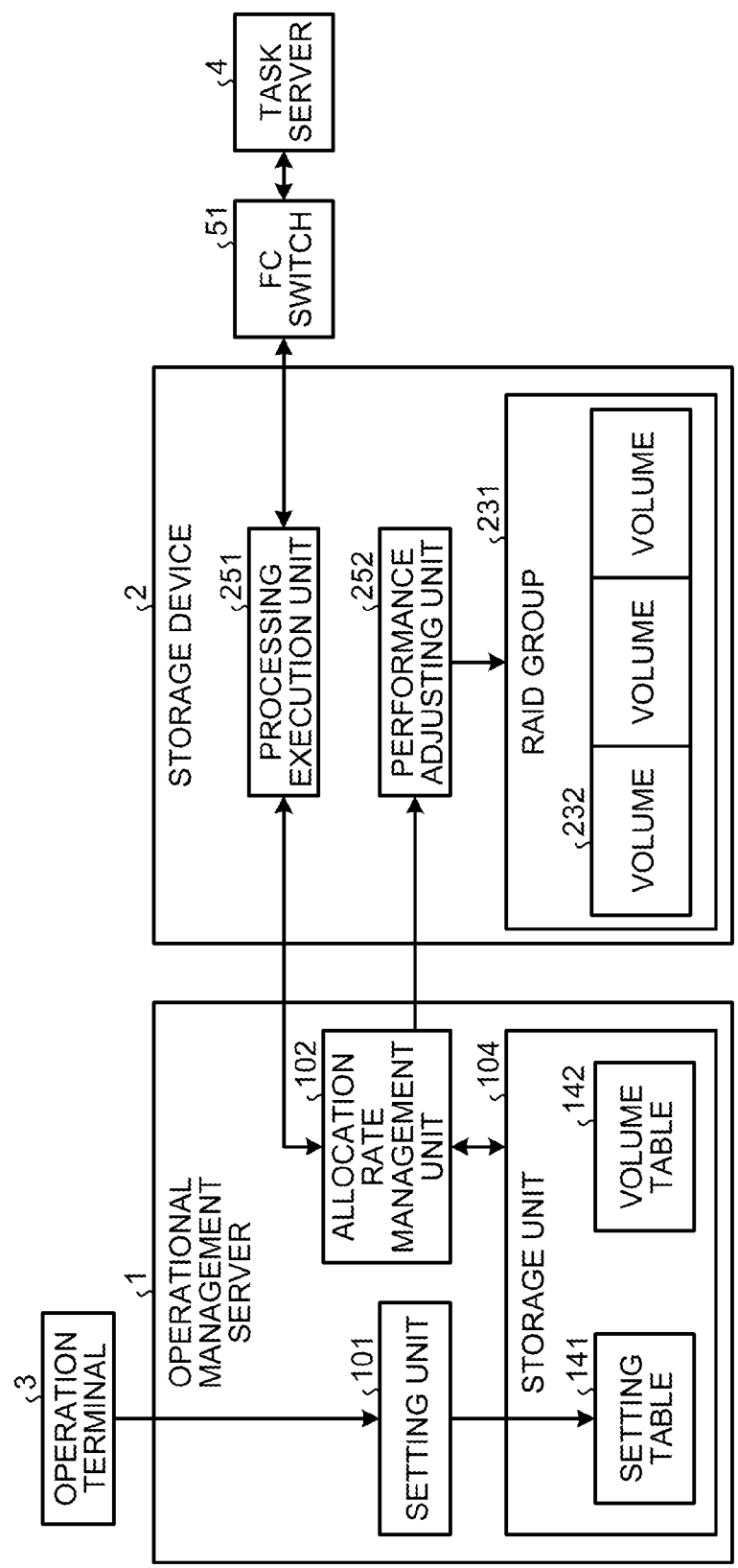
FIG. 3 is a block diagram of an operational management server and a storage device according to the first embodiment.

FIG. 3 is a block diagram of the operational management server and the storage device according to the first embodiment. The operational management server 1 includes a setting unit 101, an allocation rate management unit 102, and a storage unit 104. The storage device 2 includes a processing execution unit 251 and a performance adjusting unit 252.

The storage unit 104 includes a certain management information storage area that stores therein information about a setting table 141 and a volume table 142. The management information storage area of the storage unit 104 may store therein information used for producing the respective tables and the information may be tabled and used when control is performed. The function of the storage unit 104 is achieved by the HDD 14 in FIG. 2, for example.

FIG. 4 is a table illustrating an example of the setting table. The volume identifying information uniquely identifies the volume 232. In the embodiment, in the setting table 141, the volume identifying information and a target response time are registered in association with each other.

In the embodiment, the volume identifying information is represented by a number of the storage device and a number of the volume. For example, let the number of the storage device 21 in FIG. 2 be one and the number of the storage device 22 in FIG. 2 be two, "storage=1, Vol No=1" represents the volume 232 having a volume number of one of the storage device 21.

The target response time is a response time to be achieved by the volume having the corresponding volume identifying information. When no target response time is set, a symbol that represents a blank column is written in the column of the target response time.

In the volume table 142, the volume identifying information and the RAID group are registered in association with each other. The RAID group includes information about the configuration of the RAID such as the RAID level, and the number of disks 203 that compose the RAID group 231.

The setting unit 101 receives, from the operation terminal 3, the target response time of the volume 232 input by an operator. The setting unit 101 registers the target response time of the designated volume 232 in the setting table 141.

The allocation rate management unit 102 identifies the volume 232 to which the target response time has been set from the setting table 141. In the following description, the volume 232 to which the target response time has been set is referred to as the "target set volume". The volume to which no target response time has been set is referred to as "no target set volume".

The allocation rate management unit 102 selects one from the target set volumes. In the following description, the selected target set volume is referred to as the "selected volume". The allocation rate management unit 102 uses an approximate expression for obtaining a predictive response time.

The approximate expression can be expressed by the following expression (1), for example.

$$RTavg = RT_H \times HR_H + RT_M \times HR_M + RT_L \times HR_L \quad (1)$$

RTavg: AVERAGE RESPONSE TIME
$RT_H$: HIGH SPEED DISK RESPONSE TIME
$HR_H$: HIGH SPEED DISK HIT RATE
$RT_M$: MEDIUM SPEED DISK RESPONSE TIME
$HR_M$: MEDIUM SPEED DISK HIT RATE
$RT_L$: LOW SPEED DISK RESPONSE TIME
$HR_L$: LOW SPEED DISK HIT RATE Here, $HR_H + HR_M + HR_L = 100\%$. The processing of reading one piece of data from or writing one piece of data into the storage device 2 is represented in relation to each of the types of disks as follows: a high speed disk hit rate represents a probability of the processing performed on the high speed disk, a medium speed disk hit rate represents a probability of the processing performed on the medium speed disk, and a low speed disk hit rate represents a probability of the processing performed on the low speed disk.

As an access distribution function, a function can be used in which the hit rates are expressed corresponding to values of access frequency rates sorted in the descending order. In the following description, the values of access frequency rates sorted in the descending order are referred to as the "access frequency rates". By the access distribution function, a hit rate can be determined as y % when the access frequency rate is x %.

When data is allocated to the high speed disk, the medium speed disk, and the low speed disk in the descending order of the hit rate, the allocation rate of the high speed disk is the same as the access frequency rate. The high speed disk hit rate is the same as the value obtained by substituting the allocation rate of the high speed disk into the access distribution function. The medium speed disk hit rate is the value obtained by subtracting the high speed disk hit rate from a value obtained by substituting the sum of the allocation rates of the medium speed disk and the high speed disk into the access distribution function. The low speed disk hit rate is the value obtained by subtracting the high speed disk hit rate and the medium speed disk hit rate from a value obtained by substituting the sum of the allocation rates of the low speed disk (i.e., 100%), the medium speed disk, and the high speed disk into the access distribution function. The relations described above are represented by expression (2).

$$RTavg = RT_H \times f(AR_H) + RT_M \times \{f(AR_H + AR_M) - f(AR_H)\} + RT_L \times \{100 - f(AR_H + AR_M)\} \quad (2)$$

f(x): ACCESS DISTRIBUTION FUNCTION
$AR_H$: HIGH SPEED DISK ALLOCATION RATE
$AR_M$: MEDIUM SPEED DISK ALLOCATION RATE
$AR_L$: LOW SPEED DISK ALLOCATION RATE

Expression (2) can be rewritten into expression (3).

$$RTavg = RT_L + (RT_H - RT_M) \times \{f(AR_H) + f(AR_H)\} + (RT_H - RT_M) \times f(AR_H + AR_M) \quad (3)$$

In the embodiment, the allocation rate management unit 102 preliminarily stores therein an access distribution function 151 as illustrated in FIG. 5. FIG. 5 is a schematic diagram illustrating an example of the access distribution function. As illustrated in FIG. 5, the access frequency rates are represented with four levels for simple explanation; however, a larger number of levels representing the access frequency rates may be preferable. For example, the access frequency rates may be represented with 100 levels on the basis of the allocation rate represented from 0% to 100% broken down in 1% units.

The allocation rate management unit 102 preliminarily stores therein a representative value of the response time of each type of the disk 203. The response time of the disk 203 depends on the type of the disk 203, a type of input and output (I/O), and a size of I/O. The size of I/O is often issued in a small size in processing in which a high speed response is requested. The allocation rate management unit 102 thus stores therein a value of an average response time when the I/O size is small as the representative value. For example, the allocation rate management unit 102 stores therein response time information 152 as illustrated in FIG. 6. FIG. 6 is a schematic diagram illustrating an example of the response time information. FIG. 6 illustrates only RAID 1 and RAID 5 as the types of RAIDs. The allocation rate management unit 102 actually also stores therein the response times corresponding to other types of RAIDs.

The allocation rate management unit 102 acquires the information about the RAID configuration of the selected volume from the volume table 142. The allocation rate management unit 102 then acquires the response time in read and the response time in write for each type of the disk 203 on the basis of the RAID configuration of the selected volume.

The type of I/O used varies depending on the task and the ratio of read and write depending on the task. The allocation rate management unit 102 maintains information about a ratio of read and write (i.e., read rate and write rate) for each task. For example, the allocation rate management unit 102 stores therein read/write ratio information 153 as illustrated in FIG. 7. FIG. 7 is a schematic diagram illustrating an example of the read/write ratio information.

The allocation rate management unit 102 acquires a content of the task that reads data from or writes data into the selected volume from the processing execution unit 251 of the storage device 2. The allocation rate management unit 102 then acquires, from the read/write ratio information 153, the ratio of read and write corresponding to the acquired content of the task. The allocation rate management unit 102 obtains the response times of the respective types of the disks 203 in the selected volume using expression (4).

$$\text{RESPONSE TIME} = \text{READ RESPONSE TIME} \times (\text{READ RATIO}/10) + \text{WRITE RESPONSE TIME} \times (\text{WRITE RATIO}/10) \quad (4)$$

The allocation rate management unit 102 produces a combination of the allocation rates of the respective types of the disks 203 on the basis of the allocation rates that can be used in the access distribution function.

The obtained response times of the respective types of the disks 203 and the produced combination of the allocation rates are substituted into expression (3) to obtain the average response time. The obtained average response time is the predictive response time when the respective types of the disks 203 are allocated in accordance with the combination of the allocation rates.

The allocation rate management unit 102 repeats the calculation of the predictive response time by changing the combination of the allocation rates. The allocation rate management unit 102 then identifies the combination of the allocation rates for which the predictive response time is calculated as the closest one to the target response time set to the selected volume.

The allocation rate management unit 102 outputs the identified allocation rates to the performance adjusting unit 252 of the storage device.

The functions of the setting unit 101 and the allocation rate management unit 102 are achieved by the CPU 13 and the memory 12 illustrated in FIG. 2, for example. For example, various programs that achieve the functions of the setting unit 101 and the allocation rate management unit 102 are stored in the HDD 14. The CPU 13 reads the various programs from the HDD 14, loads the programs in the memory 12, and executes the processing that achieve the functions of the setting unit 101 and the allocation rate management unit 102.

The processing execution unit 251 receives a request to read data from and write data into the volume 232 from the application executed by the task server 4. The processing execution unit 251 reads data from or writes data into the volume 232 in accordance with the request. The processing execution unit 251 acquires information about an application that issues the request to read data from or write data into the volume 232 and identifies a task content of the application. The processing execution unit 251 notifies the allocation rate management unit 102 of the task content of the application that issues the request to read data from or write data into the volume 232.

The performance adjusting unit 252 receives, from the allocation rate management unit 102, the allocation rates of the respective types of the disks 203. The performance adjusting unit 252 allocates the high speed disk, the medium speed disk, and the low speed disk to the volume 232 in this order such that the received allocation rates are achieved. The performance adjusting unit 252 performs processing to cause the frequently accessed data to be stored in the high speed disk, the less frequently accessed data to be stored in the low speed disk, and the remaining data to be stored in the medium speed disk, for example.

The functions of the processing execution unit 251 and the performance adjusting unit 252 are achieved by the CPU 213 and the memory 214 illustrated in FIG. 2, for example. For example, various programs that achieve the functions of the processing execution unit 251 and the performance adjusting unit 252 are stored in the memory 214. The CPU 213 reads the various programs from the memory 214, and produces and executes the processing that achieve the functions of the processing execution unit 251 and the performance adjusting unit 252.

Figure 8:
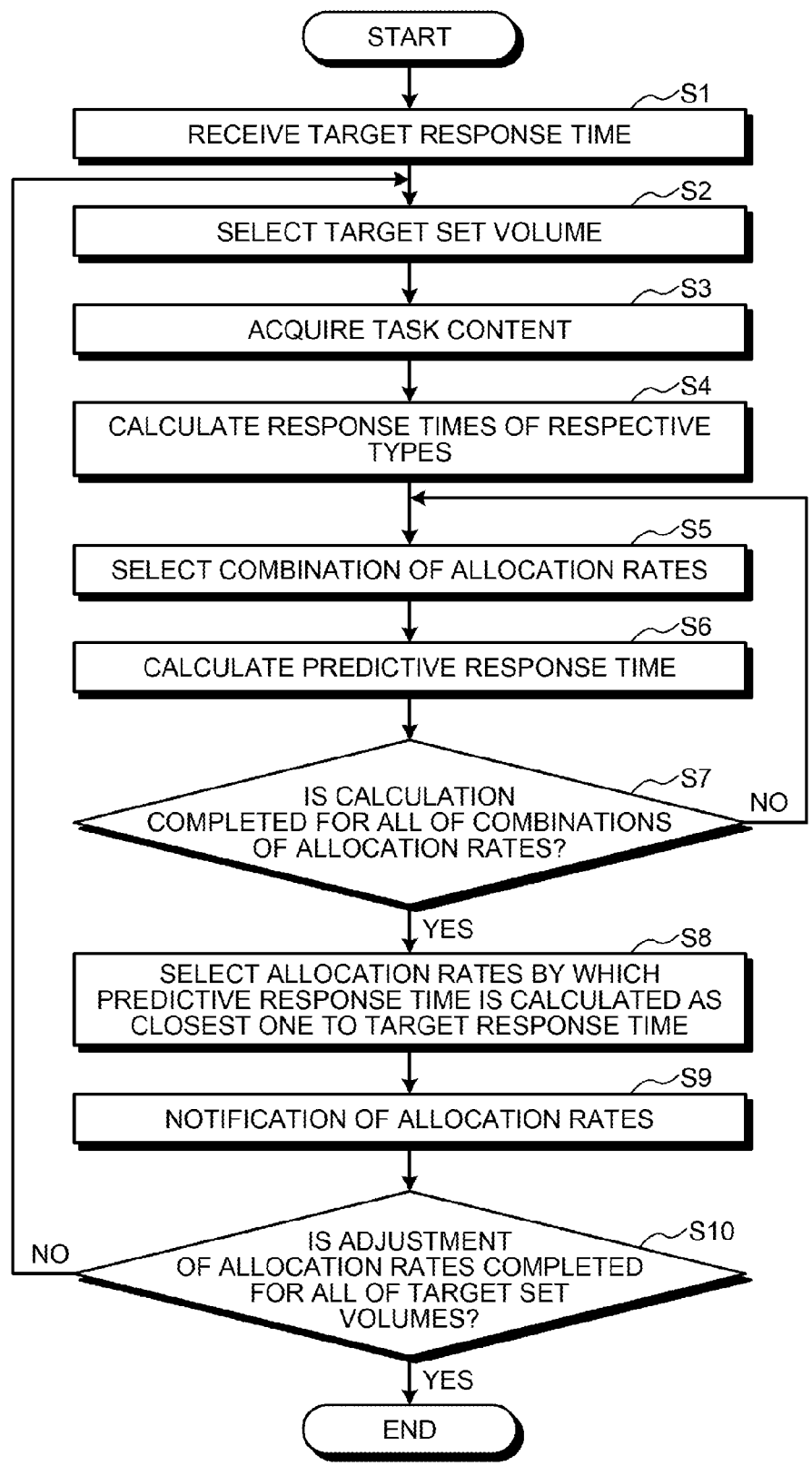
FIG. 8 is a flowchart of adjusting processing of disk allocation rates performed by the operational management server according to the first embodiment.

The following describes adjusting of the disk allocation rates performed by the operational management server 1 in the embodiment with reference to FIG. 8. FIG. 8 is a flowchart of the adjustment processing of the disk allocation rates performed by the operational management server according to the first embodiment.

The setting unit 101 receives the values of the target response times of the respective target set volumes from the operation terminal 3 (step S1). The setting unit 101 registers the received target response times to the setting table 141.

The allocation rate management unit 102 selects one of the target set volumes from the setting table 141 (step S2).

The allocation rate management unit 102 acquires the task content to be performed on the selected target set volume from the processing execution unit 251 (step S3).

The allocation rate management unit 102 acquires the ratio of read and write corresponding to the task content from the read/write ratio information 153. The allocation rate management unit 102 acquires the response times of the respective types of the disks 203 from the response time information 152. The allocation rate management unit 102 substitute the values into expression (4) for each of the respective types of the disks 203 to obtain the response time for each of the respective types of the disks 203 (step S4).

The allocation rate management unit 102 selects one of the combinations of the allocation rates of the respective types of the disks 203 (step S5).

The allocation rate management unit 102 substitutes the response times and the allocation rates of the respective types of the disks 203 into expression (3) to calculate the predictive response time based on the allocation rates (step S6).

The allocation rate management unit 102 determines whether the calculation of the predictive response time is completed for all of the combinations of the allocation rates (step S7). If there is a combination of the allocation rates remaining for which the predictive response time has not been calculated yet (No at step S7), the processing by the allocation rate management unit 102 returns to step S5.

If the calculation of the predictive response time is completed for all of the combinations of the allocation rates (Yes at step S7), the allocation rate management unit 102 selects the allocation rates for which the predictive response time is calculated as the closest one to the target response time of the selected target set volume (step S8).

The allocation rate management unit 102 notifies the performance adjusting unit 252 of the selected allocation rates as the allocation rates of the selected target set volume (step S9). The performance adjusting unit 252 allocates the respective types of the disks 203 to the target set volume such that the allocation rates received from the allocation rate management unit 102 are achieved.

The allocation rate management unit 102 determines whether the adjusting of the allocation rates is completed for all of the target set volumes (step S10). If the target set volume remains on which the adjusting of the allocation rates is not performed (No at step S10), the processing performed by the allocation rate management unit 102 returns to step S2.

If the adjusting of the allocation rates is completed for all of the target set volumes (Yes at step S10), the allocation rate management unit 102 ends the processing of adjusting the allocation rates.

As described above, the storage management apparatus according to the embodiment receives the input of the target response time of the volume and adjusts the allocation rates of the respective types of the disks 203 such that the performance of the volume gets close to the target value. The response time is an easy-to-understand indicator that can be readily set by the operator. The storage management apparatus according to the embodiment thus can contribute to the easy performance adjusting in automatic layering of the storage device.

The storage management apparatus according to the embodiment uses the statistically acquired fixed values as the access distribution function and the response times, thereby making it possible to achieve simple calculation and reduce a processing load.

Modification

In the first embodiment, the target response time is used as the performance evaluation indicator. The evaluation indicator is not limited to the target response time. For example, an input output per second (IOPS) and throughput can also be used. The following describes cases where different evaluation indicators are used.

A case is described where the IOPS is used as the evaluation indicator. The setting unit 101 receives the input of a maximum IOPS as the target value from the operation terminal 3.

The allocation rate management unit 102 stores therein the representative values of the IOPSs of the respective types of the disks 203. The IOPS depends on the type of the disk 203, the RAID configuration, the type of I/O, and the size of I/O. The size of I/O is often issued in a small size in processing in which a high IOPS is requested. The allocation rate management unit 102 thus stores therein the average value when the I/O size is small as the representative value. The IOPS can be expressed by a linear equation in relation to the effect of the RAID configuration on the basis of the basic configuration. When the IOPS is expressed by a linear equation, the coefficient depends on the RAID configuration. The allocation rate management unit 102 thus also stores therein the coefficients of the respective RAID configurations.

For example, the allocation rate management unit 102 stores therein IOPS information 161 as illustrated in FIG. 9. FIG. 9 is a schematic diagram illustrating an example of the IOPS information. The number of basic performance disks is the number of stripe disks in a minimum configuration in a certain RAID configuration and represents the number of disks 203 into which one piece of data is dispersedly written.

The allocation rate management unit 102 acquires the information about the RAID configuration of the selected volume from the volume table 142. The allocation rate management unit 102 acquires the number of basic performance disks, the basic performance IOPS, and the coefficient for each of the respective types of the disks 203 on the basis of the RAID configuration of the selected volume. The allocation rate management unit 102 substitutes the acquired number of basic performance disks, basic performance IOPS, and coefficient into expression (5) to obtain a standard maximum IOPS for each of the respective types of the disks 203.

STANDARD MAXIMUM IOPS=(BASIC PERFORMANCE IOPS/THE NUMBER OF BASIC PERFORMANCE DISKS)×THE NUMBER OF DISKS OF RAID OF TARGET SET VOLUME×COEFFICIENT (5)

The IOPS differs between the read processing and the write processing. The allocation rate management unit 102 performs correction to obtain an appropriate maximum IOPS depending on the task content using the read/write ratio information 153 illustrated in FIG. 7 when the IOPS is used as the evaluation indicator. Specifically, the maximum IOPS is obtained using expression (6).

MAXIMUM IOPS=STANDARD MAXIMUM IOPS IN READING×(READ RATIO/10)+STANDARD MAXIMUM IOPS IN WRITING×(WRITE RATIO/10) (6)

The allocation rate management unit 102 obtains an average IOPS using expression (7), which is obtained by replacing the response time with the maximum IOPS in expression (1), and sets the average IOPS as the predictive maximum IOPS. Thereafter, the allocation rate management unit 102 determines the allocation rates in the same manner as a case where the response time is used as the evaluation indicator.

AVERAGE IOPS=HIGH SPEED DISK IOPS×HIGH SPEED DISK HIT RATE+MEDIUM SPEED DISK IOPS×MEDIUM SPEED DISK HIT RATE+LOW SPEED DISK IOPS×LOW SPEED DISK HIT RATE (7)

A case is described where throughput is used as the evaluation indicator. The setting unit 101 receives the input of a target throughput from the operation terminal 3.

The allocation rate management unit 102 stores therein the representative values of the throughputs of the respective types of the disks 203. The throughput is preferably set as the indicator in relation to sequential I/O. The throughput varies depending on the size of I/O and a block size of I/O. The I/O is often issued in a large size in processing where a high throughput is requested. The allocation rate management unit 102 thus stores therein an average value when the size of I/O is a large as the representative value. The throughput can also be expressed by a linear equation in relation to the effect of the RAID configuration on the basis of the basic configuration. When the throughput is expressed by a linear equation, the coefficient depends on the RAID configuration. The allocation rate management unit 102 thus also stores therein the coefficients of the respective RAID configurations.

For example, the allocation rate management unit 102 stores therein throughput information 162 as illustrated in FIG. 10. FIG. 10 is a schematic diagram illustrating an example of the throughput information.

The allocation rate management unit 102 acquires the information about the RAID configuration of the selected volume from the volume table 142. The allocation rate management unit 102 acquires the number of basic performance disks, the basic performance throughput, and the coefficient for each of the respective types of the disks 203 on the basis of the RAID configuration of the selected volume. The allocation rate management unit 102 substitutes the acquired number of basic performance disks, basic performance throughput, and coefficient into expression (8) to obtain a standard throughput for each of the respective types of the disks 203.

STANDARD THROUGHPUT= (8)

(BASIC PERFORMANCE THROUGHPUT/THE

NUMBER OF BASIC PERFORMANCE DISKS)×

THE NUMBER OF DISKS OF RAID OF TARGET

SET VOLUME×COEFFICIENT

The throughput also differs between the read processing and the write processing. The allocation rate management unit 102 performs correction to obtain an appropriate throughput depending on the task content using the read/write ratio information 153 illustrated in FIG. 7 when the throughput is used as the evaluation indicator. Specifically, the throughput is obtained using expression (9).

THROUGHPUT=STANDARD THROUGHPUT IN
READING×(READ RATIO/10)+STANDARD
THROUGHPUT IN WRITING×(WRITE
RATIO/10)                                                    (9)

The allocation rate management unit 102 obtains an average throughput using expression (10), which is obtained by replacing the response time with the throughput in expression (1), and sets the average throughput as the predictive throughput. Thereafter, the allocation rate management unit 102 determines the allocation rates in the same manner as the case where the response time is used as the evaluation indicator.

AVERAGE THROUGHPUT =                                         (10)

HIGH SPEED DISK THROUGHPUT × HIGH SPEED DISK

HIT RATE + MEDIUM SPEED DISK THROUGHPUT ×

MEDIUM SPEED DISK HIT RATE + LOW SPEED

DISK THROUGHPUT × LOW SPEED DISK HIT RATE

As described above, the operational management server according to the embodiment can contribute to the easy performance adjusting in automatic layering of the storage device even when the IOPS and the throughput are used as the performance evaluation indicators. The evaluation indicators are not limited to specific ones as described above. Any information can be used that can evaluate the performance of the volume.

[b] Second Embodiment

Figure 11:
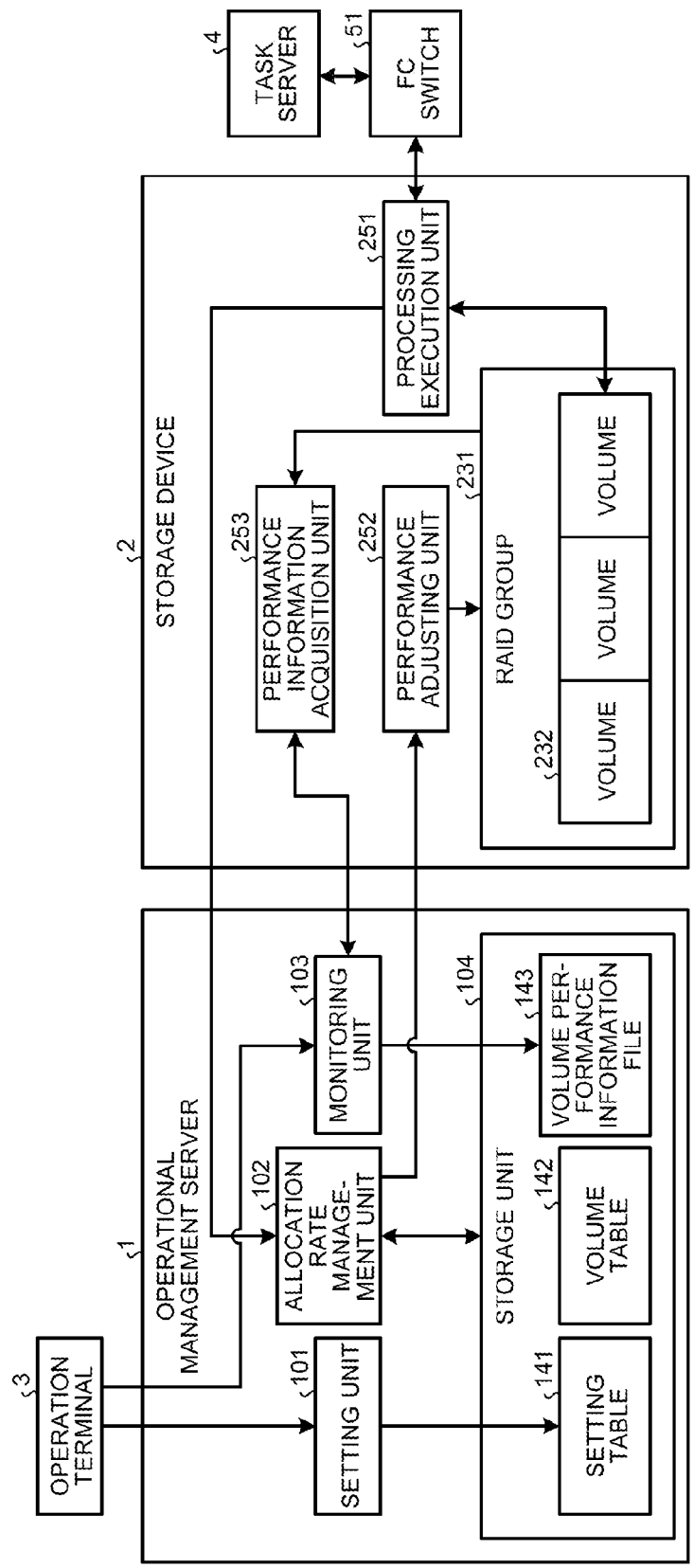
FIG. 11 is a block diagram of the operational management server and the storage device according to a second embodiment.

FIG. 11 is a block diagram of the operational management server and the storage device according to a second embodiment. The operational management server according to the second embodiment measures the performance of the storage device and obtains the access frequency function and the response times of the respective types of the disks 203 using the measurement result. The following mainly describes the calculation of the access distribution function and the response times. The descriptions on the functions of the same components as the first embodiment are omitted in the following description.

The operational management server 1 according to the embodiment includes a monitoring unit 103 in addition to the structure of the first embodiment. The storage unit 104 further stores therein a volume performance information file 143.

In the volume performance information file 143, information that indicates the actual measured performance of each volume 232 is registered. In the embodiment, volume identifying information and chunk identifying information about the chunk included in the volume are registered in the volume performance information file 143 together with a performance measurement date when the measurement is performed. In the volume performance information file 143, an actual measured response time, an actual measured throughput, and an actual measured IOPS are registered for each chunk. In the following description, the chunk identifying information, and the actual measured response time, the actual measured throughput, and the actual measured IOPS for each chunk are collectively referred to as "chunk performance information" in some cases.

The actual measured response time is a response time measured when data is read from or data is written into the chunk. The actual throughput is a throughput measured when data is read from or data is written into the chunk. The actual IOPS is an IOPS measured when data is read from or data is written into the chunk.

In the volume performance information file 143, the number of accesses is registered for each chunk of the respective types of the dusks 203 allocated to the volume 232. The number of accesses indicates the number of accesses from the previous adjusting of the allocation rates to the present for each chunk. The following description is based on a case where the chunk is divided into four groups. The chunk is divided such that each group has the same size after the division.

Each disk 203 has a large number of chunks. The dividing number of chunks is not limited to the example. The dividing number of chunks is preferably set to the same level as the unit width of the allocation rate of each of the respective types of the disks 203. For example, the chunk is preferably divided into 100 groups when the allocation rate is provided by one percent unit as the unit width.

The monitoring unit 103 periodically receives the chunk performance information from a performance information acquisition unit 253. The monitoring unit 103 writes the chunk performance information included in the received respective volumes 232 into the volume performance information file 143. The function of the monitoring unit 103 is also achieved by the CPU 13 and the memory 12 illustrated in FIG. 2, for example. For example, various programs that achieve the function of the monitoring unit 103 are stored in the HDD 14. The CPU 13 reads the various programs from the HDD 14, loads the programs in the memory 12, and executes the processing that achieves the function of the monitoring unit 103.

The allocation rate management unit 102 acquires the number of accesses of each chunk from the volume performance information file 143. For example, the allocation rate management unit 102 produces an access number spreadsheet 171 as illustrated in FIG. 12 from the acquired numbers of accesses. In the access number spreadsheet 171, chunks #1 through #4 are the four divided chunks. FIG. 12 is a spreadsheet illustrating an example of the access number spreadsheet.

The divided chunks have the same size. The rate of the number of accesses of the chunk #1 to the total number of accesses is the hit rate of the chunk #1. Likewise, the rates of the respective chunks #2 through #4 are the hit rates of the respective chunks #2 through #4. The allocation rate management unit 102 thus obtains the hit rates of the respective chunks #1 through #4, which rates are illustrated in FIG. 13, from the access number spreadsheet 171. FIG. 13 is a schematic diagram illustrating an example of the hit rates of the respective chunks #1 through #4.

The rate of the size of the chunk to the chunk before being divided corresponds to the access frequency rate of the chunk. The allocation rate management unit 102 can produce an access distribution function 172 as illustrated in FIG. 14, in which a correspondence relation is expressed between the access frequency rate and the hit rate. FIG. 14 is a schematic diagram illustrating an example of the access distribution function produced by the allocation rate management unit.

The allocation rate management unit 102 acquires, from the volume performance information file 143, the type of the disk 203 to which the chunk belongs and the response time of the chunk, for each chunk. The allocation rate management unit 102 calculates the average response times of the respective chunks. The allocation rate management unit 102 calculates, as the response times of the respective types of the disks 203, the average response times of the respective types of the disks 203 from the average response times of the respective chunks on the basis of the types of disks to which the respective chunks belong.

The allocation rate management unit 102 selects the combination of allocation rates and calculates the predictive response time by applying the produced access distribution function 172 and the calculated response times of the respective types of the disks 203 to expression (3). Thereafter, the allocation rate management unit 102 determines the allocation rates in the same manner as the first embodiment.

The performance information acquisition unit 253 receives an instruction to start performance collection from the monitoring unit 103. The performance information acquisition unit 253 periodically acquires the performance information about each volume 232 and transmits the acquired information to the monitoring unit 103. The performance information acquisition unit 253 periodically acquires the performance information about each resource and transmits the acquired information to the monitoring unit 103.

The function of the performance information acquisition unit 253 is also achieved by the CPU 213 and the memory 214 illustrated in FIG. 2, for example. For example, various programs that achieve the function of the performance information acquisition unit 253 are stored in the memory 214. The CPU 213 reads the various programs from the memory 214 and produces and executes the processing that achieves the function of the performance information acquisition unit 253.

As described above, the storage management apparatus according to the embodiment obtains the access distribution function and the response times using the measured number of accesses and response times to determine the allocation rates. The storage management apparatus according to the embodiment determines the allocation rates on the basis of the actual measured values as described above, thereby making it possible to adjust the allocation rates such that the performance of the volume more accurately gets close to the target response time.

Modification

In the second embodiment, the target response time is used as the performance evaluation indicator. The storage management apparatus having the functions described in the second embodiment can also use the IOPS and the throughput as the evaluation indicators. The following describes cases where different evaluation indicators are used.

A case is described where the IOPS is used as the evaluation indicator. The allocation rate management unit 102 produces the access distribution function in the same manner as the second embodiment.

The allocation rate management unit 102 acquires, from the volume performance information file 143, the type of the disk 203 to which the chunk belongs and the IOPS of the chunk, for each chunk. The IOPS is the indicator that represents the number of inputs or outputs (I/O) per second. The IOPS is thus calculated from the values monitored in a certain period of time. When the monitoring time is long, there is a case that the disk performance does not reach 100% due to fluctuations in the I/O load. In such the case, the allocation rate management unit 102 needs to perform correction frequently, thereby increasing the load. The monitoring time of the IOPS is thus preferably set to a short time.

The allocation rate management unit 102 calculates the average IOPSs of the respective chunks. Specifically, the allocation rate management unit 102 obtains the average IOPS by dividing the number of I/O times in a monitoring time by the monitoring time. The allocation rate management unit 102 calculates the average IOPSs of the respective types of the disks 203 from the average IOPSs of the respective chunks on the basis of the types of disks in which the respective chunks are included.

When an I/O load rate from the host to the disk 203 in which the chunk is included is low, the average IOPS calculated by the allocation rate management unit 102 is lower than the maximum IOPS at which the chunk can perform processing. The allocation rate management unit 102 acquires a busy rate of each disk 203 from the volume performance information file 143. When the busy rate of the disk 203 including the chunk the response time of which is to be obtained is 100%, the allocation rate management unit 102 uses the calculated average IOPS as the IOPS of the chunk. When the busy rate of the disk 203 including the chunk the response time of which is to be obtained is smaller than 100%, the allocation rate management unit 102 uses, as the IOPS of the chunk, a value corrected such that the value is obtained under the maximum performance.

Specifically, the allocation rate management unit 102 calculates the IOPS using expression (11).

$$\text{IOPS} = \text{ACTUAL MEASURED IOPS} \times (\text{COEFFICIENT}/\text{BUSY RATE}) \quad (11)$$

The efficient is a value obtained from a preliminarily measured result of a relation between the busy rate and the IOPS in accordance with the type of the disk 203. The busy rate and the IOPS are not always simply proportional to each other. The coefficient is used as a representative value in accordance with each busy rate. For example, the coefficient is obtained by expression (12).

$$\text{COEFFICIENT} = \textit{IOPS} \text{ WHEN BUSY RATE IS } 100\% / \text{ACTUAL MEASURED } \textit{IOPS} \times \text{BUSY RATE} \quad (12)$$

When the chunks are included in the same type of the disk 203 after the calculation of the IOPSs of the respective chunks, the allocation rate management unit 102 sets, as the IOPS of that type of the disk 203, the highest value out of the IOPSs of the chunks without being corrected. The allocation rate management unit 102 registers the calculated IOPSs of the respective types of the disks 203. For example, the allocation rate management unit 102 registers the calculated IOPSs of the respective types of the disks 203 to an IOPS information table 173 as illustrated in FIG. 15 and retains the information. FIG. 15 is a table illustrating an example of the IOPS information table.

The allocation rate management unit 102 repeats the calculation of the IOPSs of the respective types of the disks 203 as described above until timing of the adjusting of the allocation rates. When any of the following three conditions is satisfied, the allocation rate management unit 102 updates the value of the registered IOPS to a newly calculated IOPS.

The first condition is that the registered value has been corrected and a newly obtained value has not been corrected. The second condition is that both of the registered value and a newly obtained value have not been corrected and the newly obtained value is larger than the registered value. The third condition is that both of the registered value and a newly obtained value have been corrected and the newly obtained value is larger than the registered value.

At the timing of the adjusting of the allocation rates, the allocation rate management unit 102 acquires the IOPSs registered in the IOPS information table 173 as the IOPSs of the respective types of the disks 203.

When the throughput is used as the evaluation indicator, the allocation rate management unit 102 can calculate the throughputs of the respective types of the disks 203 in the same manner as in the case where the IOPS is used as the evaluation indicator. The throughput is the number of transferred blocks per unit time from the task server 4 to the storage device 2. When the throughput is used as the evaluation indicator, the allocation rate management unit 102 acquires the number of transferred blocks instead of the number of I/O times. Other processing than that is the same manner as in the case where the IOPS is used as the evaluation indicator.

As described above, the operational management server according to the modification can obtain the same effect as the second embodiment even when the IOPS and the throughput are used as the performance evaluation indicators. The evaluation indicators are not limited to specific ones as described above. Any information can be used that can evaluate the performance of the volume.

[c] Third Embodiment

A third embodiment is described below. The operational management server 1 according to the third embodiment measures the response time of the volume 232 and adjusts the allocation rates on the basis of a comparison between the target response time and an actual measured response time. The following mainly describes the adjusting of the allocation rates using the target response time and the actual measured response time. The operational management server 1 and the storage device 2 according to the embodiment are also illustrated in FIG. 11. The descriptions on the functions of the same components as the first embodiment are omitted in the following description.

In the volume performance information file 143 according to the embodiment, the performance measurement date when the measurement is performed, the volume identifying information, and the actual measured response time, the actual measured throughput, and the actual measured IOPS, of each volume are registered in association with one another. In the following description, the volume identifying information, the chunk identifying information, and the actual measured response time, the actual measured throughput, and the actual measured IOPS are collectively referred to as "volume performance information" in some cases.

The actual measured response time of each volume is a response time measured when data is read from or data is written into the volume 232. The actual throughput is a throughput measured when data is read from or data is written into the volume 232. The actual IOPS is an IOPS measured when data is read from or data is written into the volume 232.

The monitoring unit 103 periodically receives the volume performance information from a performance information acquisition unit 253. The monitoring unit 103 writes the respective pieces of volume performance information into the volume performance information file 143.

The allocation rate management unit 102 causes the storage unit 104 to store the allocation rates of the respective types of the disks 203 used for the adjusting after the adjusting of the allocation rates. For example, the allocation rate management unit 102 may provide a column for the allocation rates in the setting table 141 of the storage unit 104 so as to register the allocation rates. The respective allocation rates stored by the storage unit 104 are referred to as a "high speed disk allocation rate", a "medium speed disk allocation rate", and a "low speed disk allocation rate".

The allocation rate management unit 102 preliminarily stores therein an "increase-decrease amount" as an adjusting range of the allocation rate. The increase-decrease amount is the upper limit when the allocation rate is changed and is a value in a range from 0% to 100%. In the embodiment, the allocation rate management unit 102 stores therein a fixed value in a range from 0% to 100% as the increase-decrease amount.

The allocation rate management unit 102 preliminarily stores therein a "transferring rate to disk", which is a value how much the allocation rate of each type of the disk 203 is transferred when the allocation rates of the different types of the disks 203 are simultaneously increased or decreased. In the embodiment, when the allocation rates of the high speed disk and the medium speed disk are simultaneously increased, the allocation rate management unit 102 stores therein transferring rates to the respective disks as fixed values in a range from 0% to 100%. When the allocation rates of the medium speed disk and the low speed disk are simultaneously decreased, the allocation rate management unit 102 stores therein transferring rates to the respective disks as fixed values in a range from 0% to 100%. The transferring rates to the disks may be designated by the operator when the allocation rates are adjusted using the operational management server 1 or preliminarily designated by the administrator of the system.

The allocation rate management unit 102 selects the target set volume. The allocation rate management unit 102 acquires the actual measured response time of the selected target set volume from the volume performance information file 143. The allocation rate management unit 102 acquires the target response time of the selected target set volume from the setting table 141.

The allocation rate management unit 102 acquires the high speed disk allocation rate, the medium speed disk allocation rate, and the low speed disk allocation rate from the storage unit 104.

The allocation rate management unit 102 compares the target response time with the actual measured response time.

If the target response time and the actual measured response time are equal to each other, then the allocation rate management unit 102 ends the processing without adjusting the allocation rates.

If the actual measured response time is larger than the target response time, i.e., then the actual performance does not yet reach the target value, the allocation rate management unit 102 performs the following processing.

When the high speed disk allocation rate is 100%, which disables the adjusting of the allocation rates, the allocation rate management unit 102 ends the processing of adjusting the allocation rates.

When a value obtained by adding the increase-decrease amount to the high speed disk allocation rate is equal to or larger than 100%, the allocation rate management unit 102 changes the high speed disk allocation rate to 100% and changes the medium speed disk allocation rate and the low speed disk allocation rate to 0%.

When the low speed disk allocation rate is 0% and a value obtained by subtracting the increase-decrease amount from the medium speed disk allocation rate is equal to or larger than 0%, the allocation rate management unit 102 sets a value obtained by adding the increase-decrease amount to the high speed disk allocation rate as the high speed disk allocation rate. The allocation rate management unit 102 sets a value obtained by subtracting the increase-decrease amount from the medium speed disk allocation rate as the medium speed disk allocation rate.

When the low speed disk allocation rate is 0% and a value obtained by subtracting the increase-decrease amount from the medium speed disk allocation rate is smaller than 0%, the allocation rate management unit 102 sets a value obtained by adding the medium speed disk allocation rate to the high speed disk allocation rate as the high speed disk allocation rate. The allocation rate management unit 102 sets the medium speed disk allocation rate to 0%.

When a value obtained by subtracting the increase-decrease amount from the low speed disk allocation rate is equal to or larger than 0%, the allocation rate management unit 102 sets a result of adding a value obtained by multiplying the increase-decrease amount by the transferring rate to the high speed disk to the high speed disk allocation rate as the high speed disk allocation rate. The allocation rate management unit 102 sets, as the medium speed disk allocation rate, the sum of the medium speed disk allocation rate and the product of the increase-decrease amount and the transferring rate to the medium speed disk. The allocation rate management unit 102 sets a value obtained by subtracting the increase-decrease amount from the low speed disk allocation rate as the low speed disk allocation rate.

When a value obtained by subtracting the increase-decrease amount from the low speed disk allocation rate is smaller than 0%, the allocation rate management unit 102 sets the sum of the low speed disk allocation rate and the high speed disk allocation rate as the high speed disk allocation rate. The allocation rate management unit 102 sets the low speed disk allocation rate to 0%.

When the actual measured response time is smaller than the target response time, i.e., the actual performance exceeds the target value, the allocation rate management unit 102 performs the following processing.

When the low speed disk allocation rate is 100%, which disables the adjusting of the allocation rates, the allocation rate management unit 102 ends the processing of adjusting the allocation rates.

When a value obtained by adding the increase-decrease amount to the low speed disk allocation rate is equal to or larger than 100%, the allocation rate management unit 102 changes the low speed disk allocation rate to 100% and changes the high speed disk allocation rate and the medium speed disk allocation rate to 0%.

When the high speed disk allocation rate is 0% and a value obtained by subtracting the increase-decrease amount from the medium speed disk allocation rate is equal to or larger than 0%, the allocation rate management unit 102 sets the sum of the increase-decrease amount and the low speed disk allocation rate as the low speed disk allocation rate. The allocation rate management unit 102 sets a value obtained by subtracting the increase-decrease amount from the medium speed disk allocation rate as the medium speed disk allocation rate.

When the high speed disk allocation rate is 0% and a value obtained by subtracting the increase-decrease amount from the medium speed disk allocation rate is smaller than 0%, the allocation rate management unit 102 sets the sum of the medium speed disk allocation rate and the low speed disk allocation rate as the low speed disk allocation rate. The allocation rate management unit 102 sets the medium speed disk allocation rate to 0%.

When a value obtained by subtracting the increase-decrease amount from the high speed disk allocation rate is equal to or larger than 0%, the allocation rate management unit 102 sets, as the low speed disk allocation rate, the sum of the low speed disk allocation rate and the product of the increase-decrease amount and the transferring rate to the low speed disk. The allocation rate management unit 102 sets, as the medium speed disk allocation rate, the sum of the medium speed disk allocation rate and the product of the increase-decrease amount and the transferring rate to the medium speed disk. The allocation rate management unit 102 sets a value obtained by subtracting the increase-decrease amount from the high speed disk allocation rate as the high speed disk allocation rate.

When a value obtained by subtracting the increase-decrease amount from the high speed disk allocation rate is smaller than 0%, the allocation rate management unit 102 sets the sum of the high speed disk allocation rate and the low speed disk allocation rate as the low speed disk allocation rate. The allocation rate management unit 102 sets the high speed disk allocation rate to 0%.

The allocation rate management unit 102 causes the storage unit 104 to store therein the changed high speed disk allocation rate, the changed medium speed disk allocation rate, and the changed low speed disk allocation rate.

Figure 16:
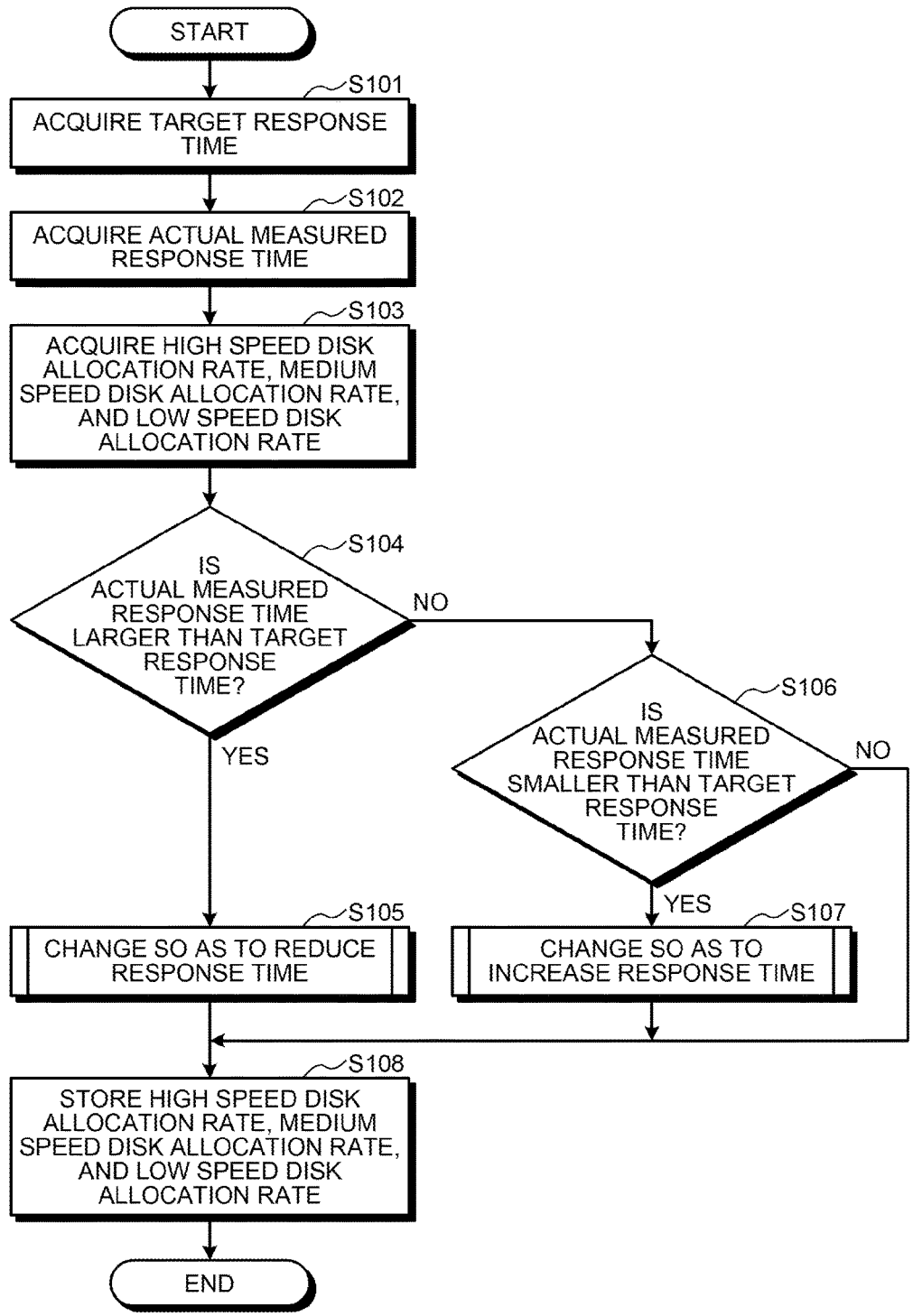
FIG. 16 is a flowchart of adjusting processing of the disk allocation rates performed by the operational management server according to a third embodiment.

The following describes an overall flow of the adjusting processing of the allocation rates performed by the operational management server 1 according to the embodiment with reference to FIG. 16. FIG. 16 is a flowchart of the adjusting processing of the allocation rates performed by the operational management server according to the third embodiment. FIG. 16 illustrates the adjusting processing of the allocation rates for the target set volume. Actually, the operational management server 1 performs the processing illustrated in FIG. 16 on all of the target set volumes.

The allocation rate management unit 102 acquires the target response time from the setting table 141 (step S101).

The allocation rate management unit 102 acquires the actual measured response time from the volume performance information file 143 (step S102).

The allocation rate management unit 102 acquires the high speed disk allocation rate, the medium speed disk allocation rate, and the low speed disk allocation rate that are stored in the storage unit 104 (step S103).

The allocation rate management unit 102 determines whether the actual measured response time is larger than the target response time (step S104). If the actual measured response time is larger than the target response time (Yes at step S104), the allocation rate management unit 102 changes the allocation rates so as to reduce the response time (step S105).

If the actual measured response time is equal to or smaller than the target response time (No at step S104), the allocation rate management unit 102 determines whether the actual measured response time is smaller than the target response time (step S106).

If the actual measured response time is smaller than the target response time (Yes at step S106), the allocation rate management unit 102 changes the allocation rates so as to increase the response time (step S107).

If the actual measured response time and the target response time are equal to each other (No at step S106), the processing performed by the allocation rate management unit 102 proceeds to step S108.

The allocation rate management unit 102 stores the adjusted high speed disk allocation rate, the adjusted medium speed disk allocation rate, and the adjusted low speed disk allocation rate in the storage unit 104 (step S108).

Figure 17:
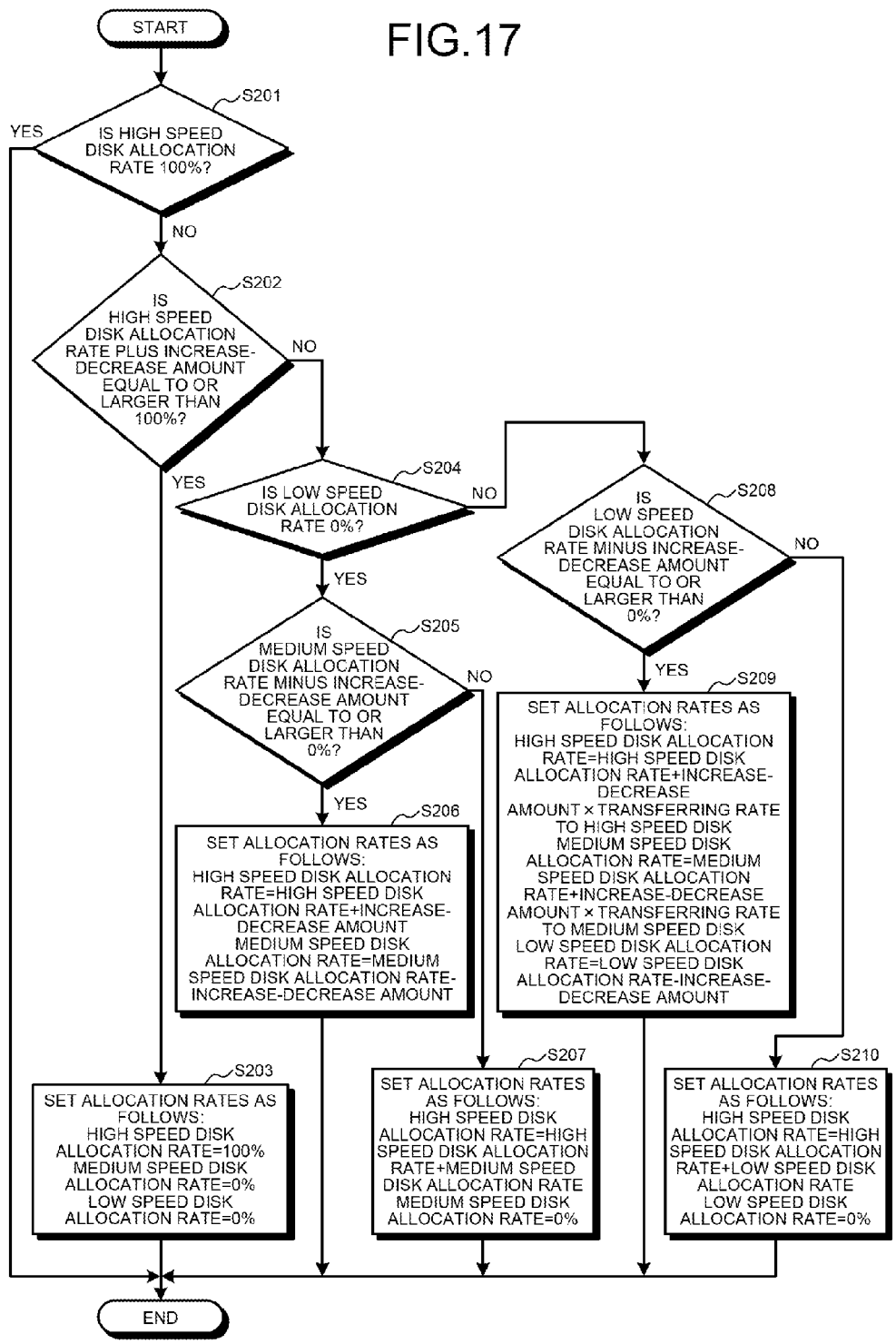
FIG. 17 is a flowchart of the processing to change the allocation rates so as to reduce a response time.

The following describes the processing to change the allocation rates so as to reduce the response time with reference to FIG. 17. FIG. 17 is a flowchart of the processing to change the allocation rates so as to reduce the response time. The processing illustrated in FIG. 17 is an example of the processing at step S105 in FIG. 16.

The allocation rate management unit 102 determines whether the high speed disk allocation rate is 100% (step S201). If the high speed disk allocation rate is 100% (Yes at step S201), the allocation rate management unit 102 ends the processing.

If the high speed disk allocation rate is not 100% (No at step S201), the allocation rate management unit 102 determines whether a value obtained by adding the increase-decrease amount to the high speed disk allocation rate is equal to or larger than 100% (step S202).

If the value obtained by adding the increase-decrease amount to the high speed disk allocation rate is equal to or larger than 100% (Yes at step S202), the allocation rate management unit 102 sets the high speed disk allocation rate to 100% and sets the medium speed disk allocation rate and the low speed disk allocation rate to 0% (step S203).

If the value obtained by adding the increase-decrease amount to the high speed disk allocation rate is smaller than 100% (No at step S202), the allocation rate management unit 102 determines whether the low speed disk allocation rate is 0% (step S204).

If the low speed disk allocation rate is 0% (Yes at step S204), the allocation rate management unit 102 determines whether a value obtained by subtracting the increase-decrease amount from the medium speed disk allocation rate is equal to or larger than 0% (step S205).

If the value obtained by subtracting the increase-decrease amount from the medium speed disk allocation rate is equal to or larger than 0% (Yes at step S205), the allocation rate management unit 102 sets a value obtained by adding the increase-decrease amount to the high speed disk allocation rate as the high speed disk allocation rate. In addition, the allocation rate management unit 102 sets a value obtained by subtracting the increase-decrease amount from the medium speed disk allocation rate as the medium speed disk allocation rate (step S206).

If the value obtained by subtracting the increase-decrease amount from the medium speed disk allocation rate is smaller than 0% (No at step S205), the allocation rate management unit 102 sets a value obtained by adding the medium speed disk allocation rate to the high speed disk allocation rate as the high speed disk allocation rate. In addition, the allocation rate management unit 102 sets the medium speed disk allocation rate to 0% (step S207).

If the low speed disk allocation rate is not 0% (No at step S204), the allocation rate management unit 102 determines whether a value obtained by subtracting the increase-decrease amount from the low speed disk allocation rate is equal to or larger than 0% (step S208).

If the value obtained by subtracting the increase-decrease amount from the low speed disk allocation rate is equal to or larger than 0% (Yes at step S208), the allocation rate management unit 102 sets, as the high speed disk allocation rate, the sum of the high speed disk allocation rate and the product of the increase-decrease amount and the transferring rate to the high speed disk. In addition, the allocation rate management unit 102 sets, as the medium speed disk allocation rate, the sum of the medium speed disk allocation rate and the product of the increase-decrease amount and the transferring rate to the medium speed disk. In addition, the allocation rate management unit 102 sets a value obtained by subtracting the increase-decrease amount from the low speed disk allocation rate as the low speed disk allocation rate (step S209).

If the value obtained by subtracting the increase-decrease amount from the low speed disk allocation rate is smaller than 0% (No at step S208), the allocation rate management unit 102 sets a value obtained by adding the low speed disk allocation rate to the high speed disk allocation rate as the high speed disk allocation rate. In addition, the allocation rate management unit 102 sets the low speed disk allocation rate to 0% (step S210).

Figure 18:
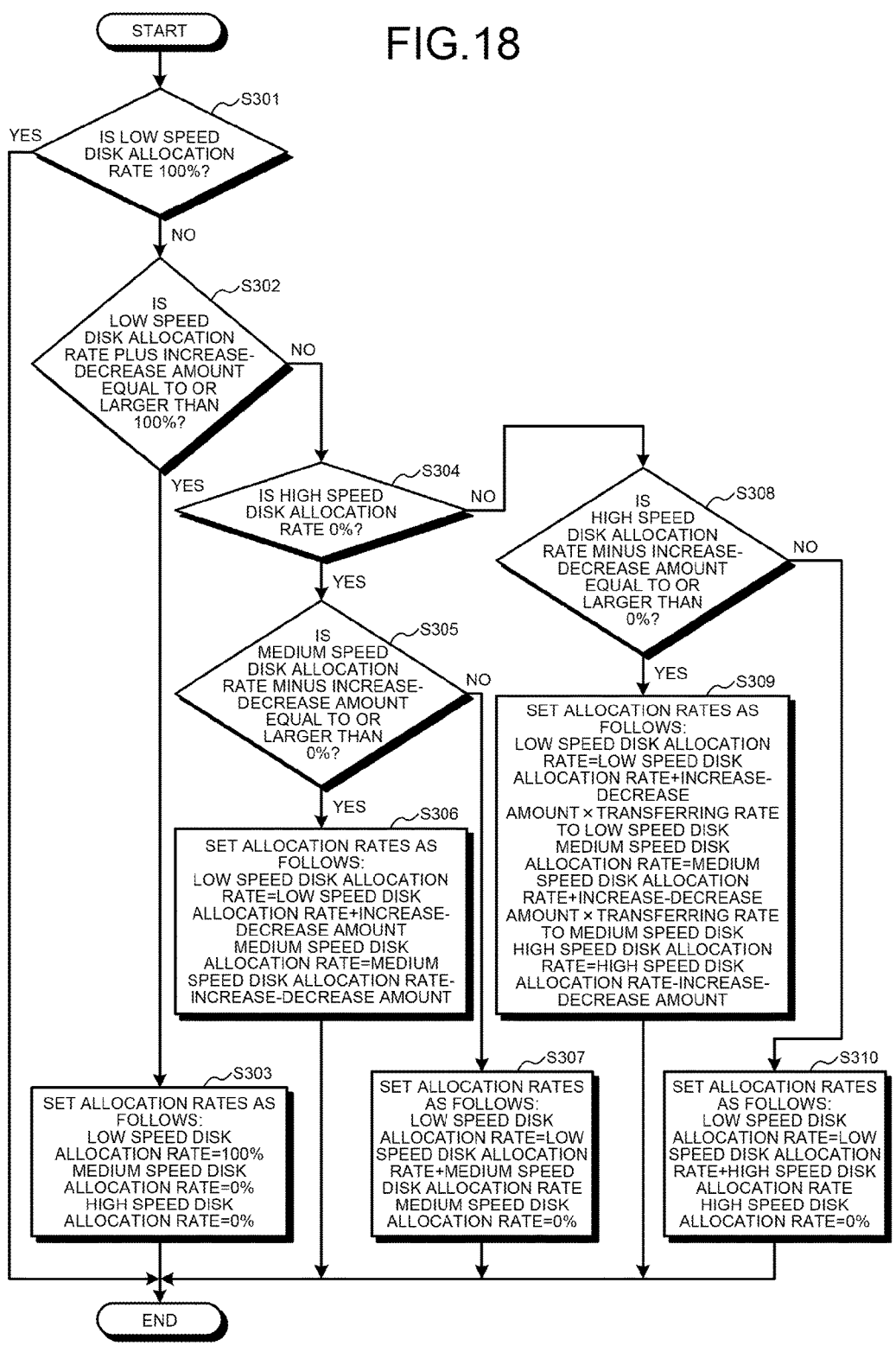
FIG. 18 is a flowchart of the processing to change the allocation rates so as to increase the response time.

The following describes the processing to change the allocation rates so as to increase the response time with reference to FIG. 18. FIG. 18 is a flowchart of the processing to change the allocation rates so as to increase the response time. The processing illustrated in FIG. 18 is an example of the processing at step S107 in FIG. 16.

The allocation rate management unit 102 determines whether the low speed disk allocation rate is 100% (step S301). If the low speed disk allocation rate is 100% (Yes at step S301), the allocation rate management unit 102 ends the processing.

If the low speed disk allocation rate is not 100% (No at step S301), the allocation rate management unit 102 determines whether a value obtained by adding the increase-decrease amount to the low speed disk allocation rate is equal to or larger than 100% (step S302).

If the value obtained by adding the increase-decrease amount to the low speed disk allocation rate is equal to or larger than 100% (Yes at step S302), the allocation rate management unit 102 sets the low speed disk allocation rate to 100% and sets the high speed disk allocation rate and the medium speed disk allocation rate to 0% (step S303).

If the value obtained by adding the increase-decrease amount to the low speed disk allocation rate is smaller than 100% (No at step S302), the allocation rate management unit 102 determines whether the high speed disk allocation rate is 0% (step S304).

If the high speed disk allocation rate is 0% (Yes at step S304), the allocation rate management unit 102 determines whether a value obtained by subtracting the increase-decrease amount from the medium speed disk allocation rate is equal to or larger than 0% (step S305).

If the value obtained by subtracting the increase-decrease amount from the medium speed disk allocation rate is equal to or larger than 0% (Yes at step S305), the allocation rate management unit 102 sets a value obtained by adding the increase-decrease amount to the low speed disk allocation rate as the low speed disk allocation rate. In addition, the allocation rate management unit 102 sets a value obtained by subtracting the increase-decrease amount from the medium speed disk allocation rate as the medium speed disk allocation rate (step S306).

If the value obtained by subtracting the increase-decrease amount from the medium speed disk allocation rate is smaller than 0% (No at step S305), the allocation rate management unit 102 sets a value obtained by adding the medium speed disk allocation rate to the low speed disk allocation rate as the low speed disk allocation rate. In addition, the allocation rate management unit 102 sets the medium speed disk allocation rate to 0% (step S307).

If the high speed disk allocation rate is not 0% (No at step S304), the allocation rate management unit 102 determines whether a value obtained by subtracting the increase-decrease amount from the high speed disk allocation rate is equal to or larger than 0% (step S308).

If the value obtained by subtracting the increase-decrease amount from the high speed disk allocation rate is equal to or larger than 0% (Yes at step S308), the allocation rate management unit 102 sets, as the low speed disk allocation rate, the sum of the low speed disk allocation rate and the product of the increase-decrease amount and the transferring rate to the low speed disk. In addition, the allocation rate management unit 102 sets, as the medium speed disk allocation rate, the sum of the medium speed disk allocation rate and the product of the increase-decrease amount and the transferring rate to the medium speed disk. In addition, the allocation rate management unit 102 sets a value obtained by subtracting the increase-decrease amount from the high speed disk allocation rate as the high speed disk allocation rate (step S309).

If the value obtained by subtracting the increase-decrease amount from the high speed disk allocation rate is smaller than 0% (No at step S308), the allocation rate management unit 102 sets a value obtained by adding the high speed disk allocation rate to the low speed disk allocation rate as the low speed disk allocation rate. In addition, the allocation rate management unit 102 sets the high speed disk allocation rate to 0% (step S310).

As described above, the storage management apparatus according to the embodiment compares the actual measured response time with the target response time and changes the allocation rates of the disks on the basis of the difference in response time. In this case, the allocation rates are readily calculated, thereby making it possible for the storage management apparatus to perform the processing even though the calculation capacity of the storage management apparatus is low.

First Modification

The following describes a first modification of the operational management server according to the third embodiment. In the third embodiment, the transferring rates to the respective types of disks are used as fixed values. The transferring rates to the respective types of disks may be changed. The following describes an example where the transferring rates to the respective types of disks are changed.

The allocation rate management unit 102 calculates the transferring rates to the respective types of the disks 203 in proportion to free disk spaces of the respective types of the disks 203. The calculation method is described below.

When the actual measured response time is larger than the target response time and the capacity is reduced from the low speed disk, the allocation rate management unit 102 performs the following processing.

The allocation rate management unit 102 sets, as the transferring rate to the high speed disk, a result obtained by dividing a free disk space of the high speed disk by the sum of the free disk space of the high speed disk and a free disk space of the medium speed disk. The allocation rate management unit 102 sets, as the transferring rate to the medium speed disk, a result obtained by dividing the free disk space of the medium speed disk by the sum of the free disk space of the high speed disk and the free disk space of the medium speed disk.

When the actual measured response time is smaller than the target response time and the capacity is reduced from the high speed disk, the allocation rate management unit 102 performs the following processing.

The allocation rate management unit 102 sets, as the transferring rate to the medium speed disk, a result obtained by dividing the free disk space of the medium speed disk by the sum of the free disk space of the medium speed disk and a free disk space of the low speed disk. The allocation rate management unit 102 sets, as the transferring rate to the low speed disk, a result obtained by dividing the free disk space of the low speed disk by the sum of the free disk space of the medium speed disk and the free disk space of the low speed disk.

The allocation rate management unit 102 determines the allocation rates of the respective types of disks in the manner described in the third embodiment using the calculated transferring rates to the respective types of disks.

As described above, the storage management apparatus according to the modification changes the transferring rates to the respective types of disks in accordance with the free disk spaces of the respective disks. As a result, an imbalance in the free disk spaces among the respective types of disks after the adjusting of the allocation rate can be reduced.

The storage management apparatus can use the method of changing the transferring rates to the respective types of disks and the method of using fixed values as the transferring rates to the respective types of disks together.

Second Modification

The following describes a second modification of the operational management server according to the third embodiment. In the third embodiment, the increase-decrease amount is used as a fixed value. The increase-decrease amount may be changed. For example, the increase-decrease amount can be changed in accordance with a degree of difference between the target response time and the actual measured response time. The following describes an example where the increase-decrease amount to disk is changed.

The allocation rate management unit 102 calculates the increase-decrease amount in accordance with a degree of difference between the target response time and the actual measured response time. The calculation method is described below.

As an exemplary method, the allocation rate management unit 102 stores therein increase-decrease amount information 174 illustrated in FIG. 19. FIG. 19 is a schematic diagram illustrating an example of the increase-decrease amount information.

The allocation rate management unit 102 divides the actual measured response time by the target response time and acquires the increase-decrease amount corresponding to the result of the division from the increase-decrease amount information 174. The allocation rate management unit 102 determines the allocation rates of the respective types of disks 203 in the manner described in the third embodiment using the acquired increase-decrease amount.

The third embodiment, the first modification, and the second modification use the target response time as the performance evaluation indicator. The evaluation indicator is not limited to the target response time. For example, the IOPS and the throughput may be used. The larger the value of the response time is, the lower the performance is while the larger the values of the maxim IOPS and the throughput are, the higher the performance is. In the case where the maximum IOPS and the throughput are used as the evaluation indicators, the allocation rate of the high speed disk is increased when the target value is larger than the actual measured value while the allocation rate of the low speed disk is increased when the target value is smaller than the actual measured value. When the maximum IOPS and the throughput are used as the evaluation indicators, the processing after the determination of the magnitude relation between the target value and the actual measured value is reverse to that when the response time is used as the evaluation indicator.

[d] Fourth Embodiment

Figure 20:
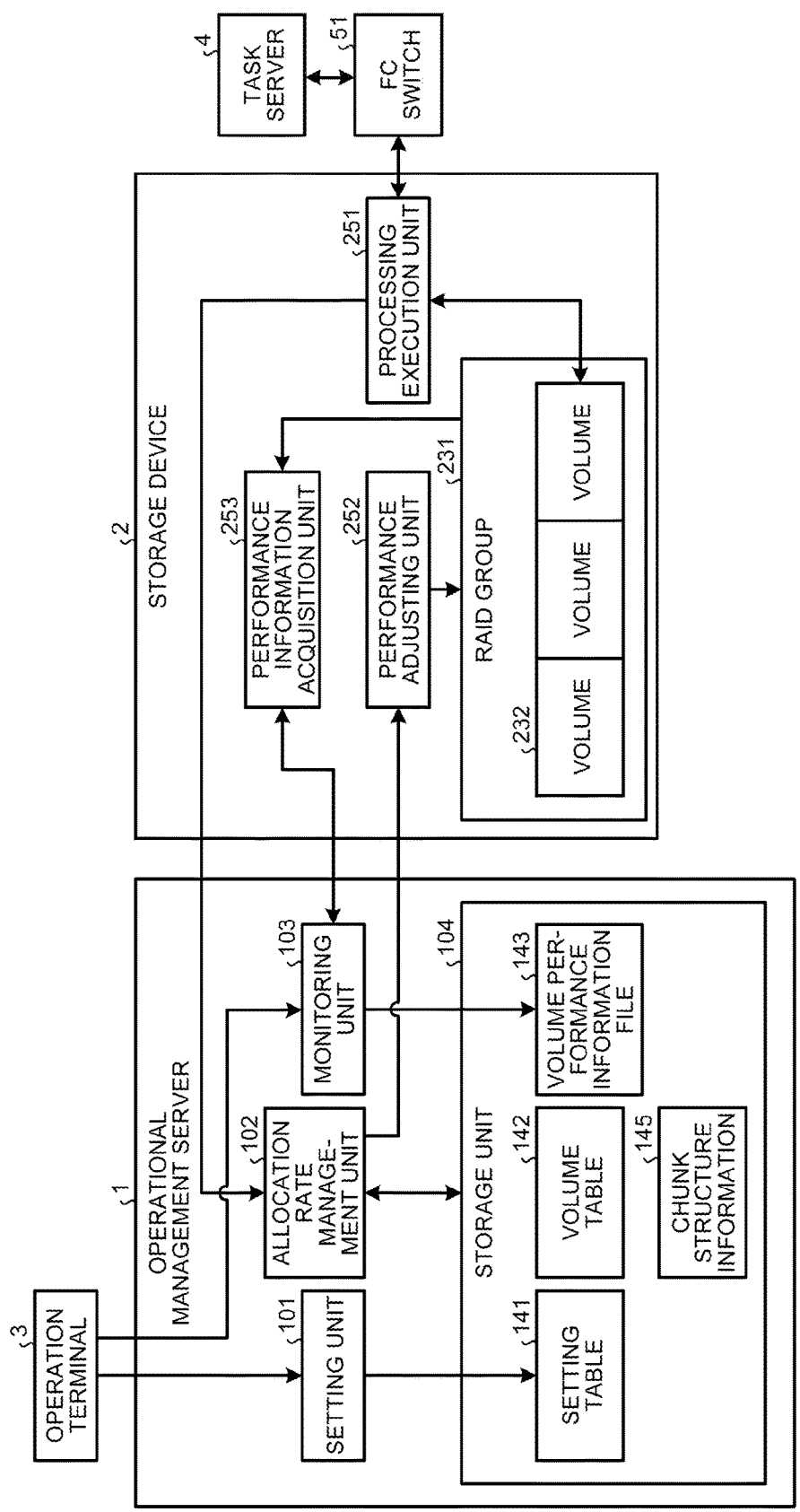
FIG. 20 is a block diagram of the operational management server and the storage device according to a fourth embodiment.

A fourth embodiment is described below. The operational management server according to the fourth embodiment completes the performance adjusting by the automatic layering function only at one time in a short time. FIG. 20 is a block diagram of the operational management server and the storage device according to the fourth embodiment. In the embodiment, the performance adjustment is performed in the same manner as the first embodiment in which the response time is used as the performance target, the response times of the respective types of the disks 203 and the access distribution function are preliminarily determined, and the performance adjustment is performed using an approximation equation.

The storage unit 104 stores, in a certain information storage area, chunk structure information 145 besides the setting table 141, the volume table 142, and the volume performance information file 143. The management information storage area of the storage unit 104 may store therein information used for producing the respective tables and the information may be tabled and used when control is performed.

The chunk structure information 145 includes chunk mapping information 181 illustrated in FIG. 21A, RAID group correspondence information 182 illustrated in FIG. 21B, and pool information 183 illustrated in FIG. 21C. FIG. 21A is a schematic diagram illustrating an example of the chunk mapping information. FIG. 21B is a schematic diagram illustrating an example of the RAID group correspondence information. FIG. 21C is a schematic diagram illustrating an example of the pool information.

The chunk mapping information 181 indicates respective addresses of the chunk in the volume 232 and the RAID group 231. The RAID group correspondence information 182 indicates a correspondence between the RAID group and the pool in which the RAID group is included. The pool is a group unit of the multiple RAID groups composed of the disks 203 of the same type. In the pool information 183, identification information about the pool and the type of the disks 203 included in the pool are registered.

The allocation rate management unit 102 stores therein an operation interval in order to perform the performance adjustment at a constant period. When the operation interval arrives, the allocation rate management unit 102 starts the processing of the performance adjustment. If the operation interval is short, the load of the operational management server 1 becomes high. If the operation interval is long, the time taken to complete the performance adjustment becomes long. The operation interval is thus preferably determined taking into consideration a balance between the load of the operational management server 1 and the time taken to complete the performance adjustment. For example, a system administrator may set an initial value estimated by the system administrator from an average performance when the system is established, and thereafter adjust the value in accordance with the operation conditions.

The allocation rate management unit 102 acquires the response times of the respective types of the disks 203 and the preliminarily determined access distribution function. The allocation rate management unit 102 acquires, from the chunk structure information 145 for each chunk, the volume including the chunk, the name of the chunk, the type of the disk, and the name of the pool, and produces chunk information 184 illustrated in FIG. 22. FIG. 22 is a schematic diagram illustrating an example of the chunk information.

The allocation rate management unit 102 acquires, from the volume performance information file 143, the response times of the respective volumes 232 and a chunk usage including the number of accesses added up for each unit time of each chunk, which is illustrated in FIG. 23. FIG. 23 is a schematic diagram illustrating an example of chunk access information.

The allocation rate management unit 102 calculates a transfer speed of data between the different types of the disks 203. As an example of the calculation method of the transfer speed, the allocation rate management unit 102 stores therein the throughputs of the respective types of the disks. When determining the transfer speed between the different types of the disks 203, the allocation rate management unit 102 sets the throughput smaller than the other as the transfer speed between the disks 203. As another method, the allocation rate management unit 102 acquires the throughputs measured by the performance information acquisition unit 253 and updates the throughputs of the respective types of the disks 203. When determining the transfer speed between the different types of the disks 203 in calculation of the transfer speed, the allocation rate management unit 102 sets the throughput smaller than the other as the transfer speed between the disks 203. In this case, the allocation rate management unit 102 may acquire the time taken to perform the data transfer, which is measured by the performance information acquisition unit 253, and obtain the throughput by dividing the chunk size by the acquired time.

The allocation rate management unit 102 determines the allocation rates of the respective types of the disks 203 in the same manner as the first embodiment.

The allocation rate management unit 102 obtains the number of accesses in a predetermined performance evaluation period of time for each chunk from the chunk access information illustrated in FIG. 22. The performance evaluation period of time may be adjusted to the operation interval of the performance adjustment or adjusted to an operation period of time of a task that uses the volume 232 serving as the adjusting target of the allocation rates.

For example, let the operation interval of the performance adjustment be 10 minutes and the operation period of time of a task be from 10 o'clock to 11 o'clock. In addition, let the chunks #1 through #3, which are illustrated in FIG. 22, be provided. When the performance evaluation period of time is adjusted to the operation interval, at 11 o'clock, the number of accesses to the chunk #1 is 50, the number of accesses to the chunk #2 is 80, and the number of accesses to the chunk #3 is 60. The order in the number of accesses is then chunk #2, chunk #3, and chunk #1 in the descending order. When the performance evaluation period of time is adjusted to the operation period of time of the task, at 11 o'clock, then the number of accesses to the chunk #1 is 300, the number of accesses to the chunk #2 is 240, and the number of accesses to the chunk #3 is 210. The order in the number of accesses is then chunk #1, chunk #2, and chunk #3 in the descending order.

The allocation rate management unit 102 determines the chunk to be transferred using the obtained number of accesses. The setting of the performance evaluation period of time has the following advantages. When the performance evaluation period of time is adjusted to the operation interval, the performance evaluation can be performed appropriately in accordance with the fluctuations of the load in a short period of time. Although the number of accesses to the chunk may be large over a long period of time, the number of accesses to the chunk sometimes may be small over a short period of time. As a result, the chunk may be evaluated as having a low performance. When the performance evaluation period of time is adjusted to the operation period of time of a task, the average access performance over the task is increased because the frequently used chunks in the task are transferred to the high speed disk in the descending order. This adjustment however can hardly cope with a rapid increase or decrease in the load.

When the actual measured response time is larger than the target response time, the allocation rate management unit 102 extracts the chunks present in the medium speed disk or the low speed disk from the chunk information 184 illustrated in FIG. 22. The allocation rate management unit 102 determines that a fixed number of frequently accessed chunks out of the extracted chunks are sequentially transferred, in a fixed period of time, in accordance with the determined allocation rates.

When the actual measured response time is smaller than the target response time, the allocation rate management unit 102 extracts the chunks present in the high speed disk from the chunk information 184 illustrated in FIG. 22. The allocation rate management unit 102 determines that a fixed number of less frequently accessed chunks out of the extracted chunks are sequentially transferred, in a fixed period of time, in accordance with the determined allocation rates.

The fixed number of chunks and the fixed period of time when the chunks are transferred are preferably set taking into consideration the chunk sizes and the transfer speed of data. The following describes in detail how to determine the fixed number of chunks and the fixed period of time in the transferring of the chunks. An average deterioration rate of performance can be obtained using expression (13).

$$DPavg = \frac{\frac{CS}{TS} \times CC}{TD} \quad (13)$$

$DPavg(\%)$ $CS$(MB): CHUNK SIZE $TS$(MB/s): DATA TRANSFER SPEED $CC$: THE NUMBER OF CHUNKS TRANSFERRED AT ONE TIME $TD$(s): CHUNK TRANSFER INTERVAL Actually, there are six patterns in the transfer between the different types of the disks 203. The deterioration rate changes depending on which pattern is used and how frequently the pattern is used. Expression (13) can be expressed as expression (14).

$$\left\{ \frac{CC_{HM}}{TS_{HM}} + \frac{CC_{HL}}{TS_{HL}} + \frac{CC_{MH}}{TS_{MH}} + \frac{CC_{ML}}{TS_{ML}} + \frac{CC_{LH}}{TS_{LH}} + \frac{CC_{LM}}{TS_{LM}} + \right\} \times \frac{CS}{TD} \leq DP_{avg} \quad (14)$$

$TSxy$(MB/s): DATA TRANSFER SPEED $CCxy$: THE NUMBER OF CHUNKS TRANSFERRED AT ONE TIME where x and y represent the types of disks, H represents the high speed disk, M represents the medium speed disk, L represents the low speed disk, and xy represents the data transfer from the disk 203 of the type x to the disk 203 of the type y.

The chunk size is constant. The average deterioration rate is determined as a fixed value, which is a preferable value. The transfer speed is determined by the allocation rate management unit 102 as described above. Let the fixed period of time of transferring of the chunks be preliminarily determined, then only the number of chunks is a variable. The fixed period of time is preferably set to a sufficiently larger value than the time taken to transfer the chunks.

When the frequently accessed chunks are sequentially transferred in the descending order, the allocation rate management unit 102 gradually increases the number of chunks and inputs the number to expression (14), and obtains the number of chunks capable of being transferred such that the calculation result does not exceed the set average deterioration rate. When the calculation result exceeds the average deterioration rate where the number of chunks is one, then the allocation rate management unit 102 increases the interval of the transferring of the chunks so as not to exceed the average deterioration rate.

Figure 24:
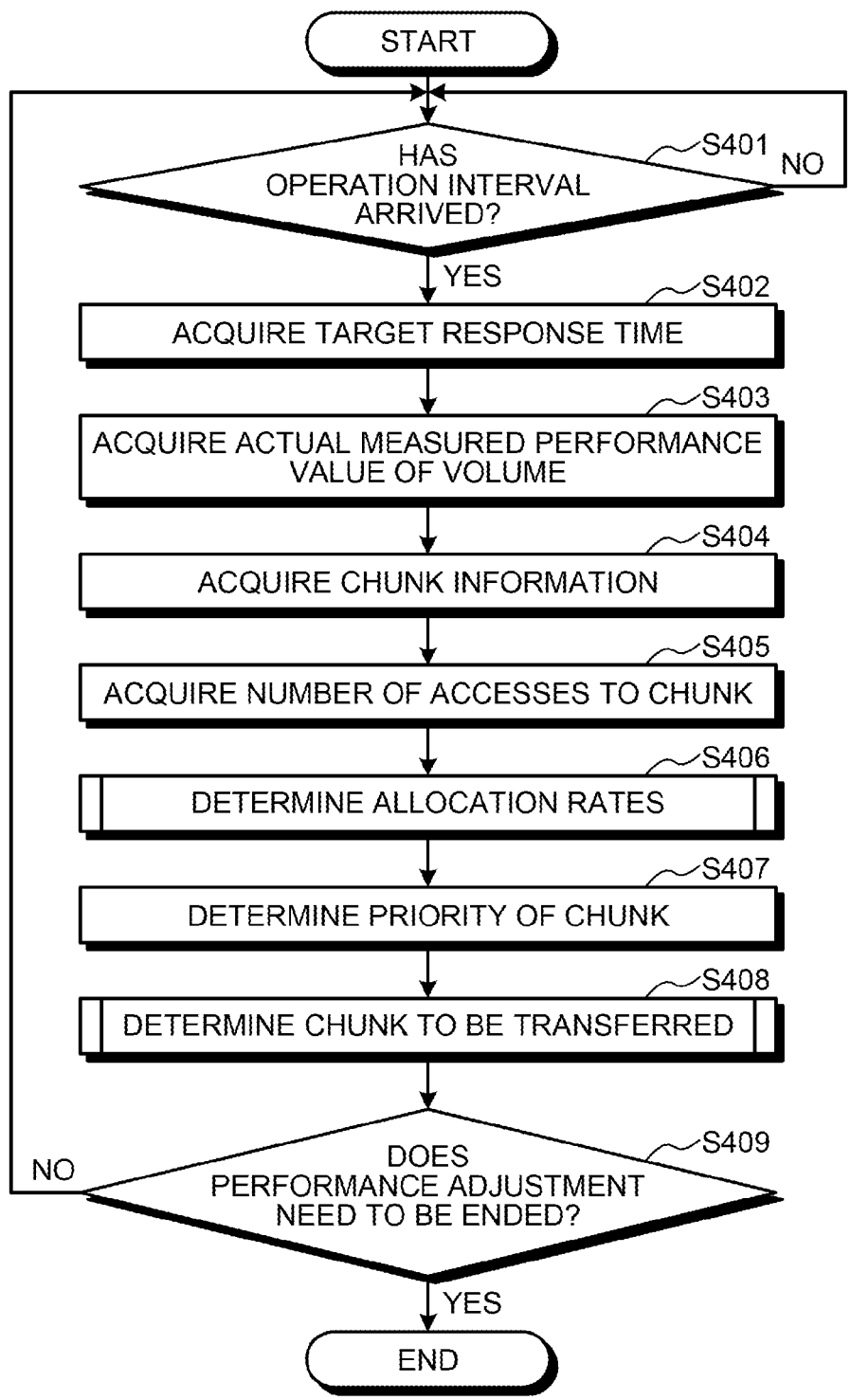
FIG. 24 is a flowchart of the performance adjustment implemented by the operational management server according to the fourth embodiment.

The following describes a flow of the performance adjustment performed by the operational management server according to the embodiment with reference to FIG. 24. FIG. 24 is a flowchart of the performance adjustment performed by the operational management server according to the fourth embodiment.

The allocation rate management unit 102 determines whether the operation interval has arrived (step S401). If the operation interval has not arrived (No at step S401), the allocation rate management unit 102 waits for the arrival of the operation interval.

If the operation interval has arrived (Yes at step S401), the allocation rate management unit 102 acquires the target response time from the setting table 141 (step S402).

The allocation rate management unit 102 acquires the actual measured performance value of the volume 232 from the volume performance information file 143 (step S403).

The allocation rate management unit 102 acquires the chunk information from the chunk structure information 145 (step S404). The allocation rate management unit 102 produces the access number spreadsheet using the numbers of accesses to the respective chunks acquired from the volume performance information file 143 (step S405).

The allocation rate management unit 102 calculates the allocation rates of the respective types of the disks 203 (step S406). The allocation rate management unit 102 calculates the allocation rates of the respective types of the disks 203 using the methods described in the respective embodiments described above.

The allocation rate management unit 102 determines the priority of the chunk on the basis of the access number spreadsheet 171 (step S407).

The allocation rate management unit 102 determines the chunk to be transferred in accordance with the priority of the chunk (step S408). The flow of the determination processing of the chunk to be transferred is described in detail later.

The allocation rate management unit 102 determines whether to end the performance adjustment (S409). For example, when receiving a shutdown instruction from the operational management server 2, the allocation rate management unit 102 determines to end the performance adjustment.

If the performance adjustment does not need to be ended (No at step S409), the processing performed by the allocation rate management unit 102 returns to step S401. If the performance adjustment needs to be ended (Yes at step S409), the allocation rate management unit 102 ends the processing.

Figure 25:
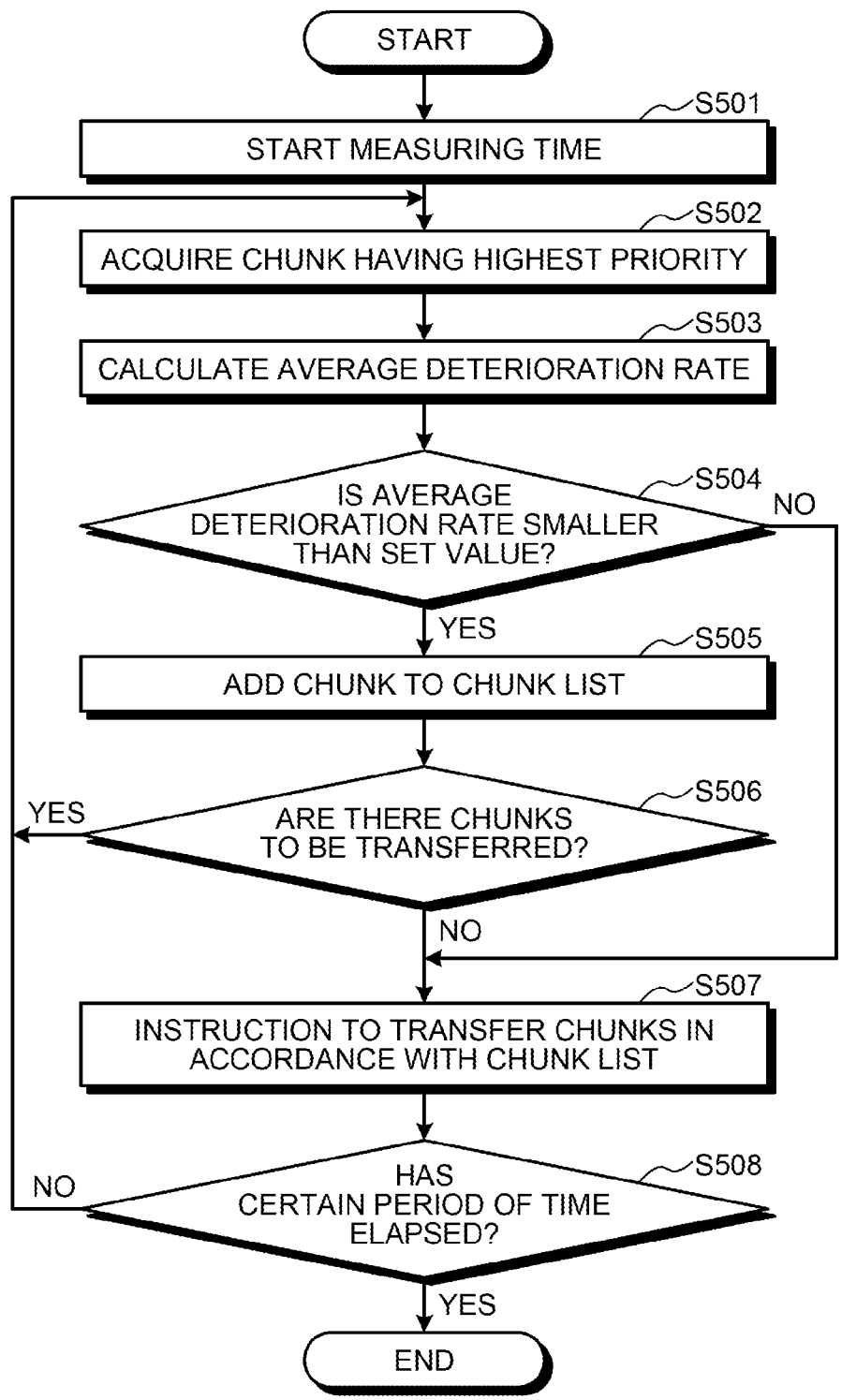
FIG. 25 is a flowchart of the processing to determine the chunk to be transferred by the operational management server according to the fourth embodiment.

The following describes a flow of the determination on the chunk to be transferred by the operational management server according to the embodiment with reference to FIG. 25. FIG. 25 is a flowchart of the processing to determine the chunk to be transferred by the operational management server according to the fourth embodiment. The flowchart illustrated in FIG. 25 is an example of the processing at step S408 in the flowchart of FIG. 24.

The allocation rate management unit 102 starts measuring time (step S501).

The allocation rate management unit 102 acquires the chunk having the highest priority (step S502).

The allocation rate management unit 102 calculates the average deterioration rate using expression (13) when the chunks listed in the transferring chunk list are transferred (step S503).

The allocation rate management unit 102 determines whether the calculated average deterioration rate is smaller than the set value of the average deterioration rate (step S504). If the calculated average deterioration rate is equal to or larger than the set value (No at step S504), the processing performed by the allocation rate management unit 102 proceeds to step S507.

If the calculated average deterioration ratio is equal to or smaller than the set value (Yes at step S504), the allocation rate management unit 102 adds the selected chunk to the chunk list (step S505).

The allocation rate management unit 102 determines whether there are chunks to be transferred (step S506). The allocation rate management unit 102 determines whether there are chunks to be transferred on the basis of whether the number of chunks listed in the chunk list exceeds a set constant number. If there are chunks to be transferred (Yes at step S506), then the processing performed by the allocation rate management unit 102 returns to step S502.

If there are no chunks to be transferred (No at step S506), then the allocation rate management unit 102 notifies the performance adjusting unit 252 of the instruction to transfer the chunks listed in the chunk list (step S507).

The allocation rate management unit 102 determines whether a certain period of time has elapsed on the basis of the measured time (step S508). If a certain period of time has not elapsed (No at step S508), then the processing performed by the allocation rate management unit 102 returns to step S502. If a certain period of time has elapsed (Yes at step S508), then the allocation rate management unit 102 ends the processing.

As described above, the storage management apparatus according to the embodiment performs the processing in which a certain number of chunks are transferred in the descending order of the transferring priority order as the one-time performance adjustment, and repeats the performance adjustment. This processing can prevent the excess performance deterioration due to the disk access. In addition, this processing can reduce the time taken to perform the performance adjustment, thereby making it possible to cope with a rapid fluctuation in a task load.

[e] Fifth Embodiment

Figure 26:
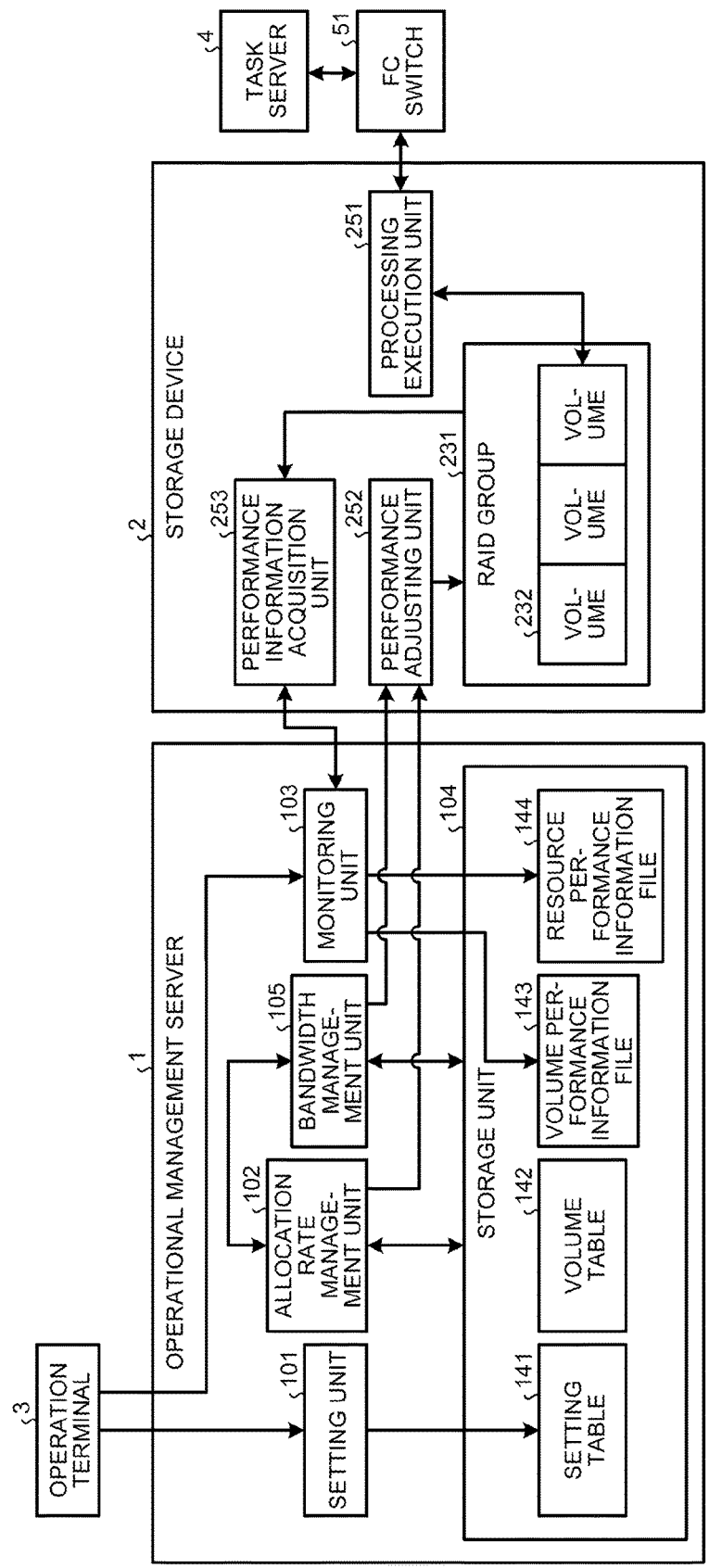
FIG. 26 is a block diagram of the operational management server and the storage device according to a fifth embodiment.

A fifth embodiment is described below. The storage system according to the fifth embodiment uses both of the QoS function and the automatic layering function. FIG. 26 is a block diagram of the operational management server and the storage device according to the fifth embodiment. The operational management server 1 according to the embodiment includes a bandwidth management unit 105. The descriptions on the functions of the same components as the first embodiment are omitted in the following description.

The storage unit 104 stores the setting table 141, the volume table 142, the volume performance information file 143, and a resource performance information file 144 in a certain information storage area. The management information storage area of the storage unit 104 may store therein information used for producing the respective tables and the information may be tabled and used when control is performed.

In the setting table 141, the target value, a current bandwidth, and current allocation rates are registered in association with the identification information about the volume 232.

In the volume table 142, the configuration information about RAID, and information about resources such as the CPU and the switches used by the volume 232 are registered in association with the identification information about the volume 232.

The volume performance information file 143 stores therein the volume performance information such as the measurement date, the actual measured response time of the volume 232, the actual measured IOPS, and the actual measured throughput in association with the identification information of the volume 232.

In the resource performance information file 144, the type of resource, the resource identifying information, and the busy rate are registered together with the performance measurement date when the measurement is performed.

The bandwidth management unit 105 manages the bandwidths of the respective volumes 232 by a method described below, for example.

The bandwidth management unit 105 acquires the resources used by the target set volume from the volume performance information file 143. The bandwidth management unit 105 identifies the resource having the highest busy rate out of the acquired resources using the resource performance information file 144. The bandwidth management unit 105 selects the volume 232 that uses the identified resource from the volume performance information file 143. When the target set volume the actual measured performance value of which does not reach the target performance value is present in the selected volume, then the bandwidth management unit 105 reserves the expansion of the bandwidth of the volume. When the target set volume the actual measured performance value of which does not reach the target performance value is present in the selected volume, then the bandwidth management unit 105 reserves the reduction of the bandwidth of the volume. The bandwidth management unit 105 may reserve the change of the bandwidth of the volume 232 to which no target performance value is set in accordance with the adjusting of the bandwidth of the target set volume.

The bandwidth management unit 105 determines the expansion or the reduction of the bandwidths of the respective target set volumes and the volume 232 to which no target is set using the reservations of the expansion and the reduction of the bandwidth, and notifies the performance adjusting unit 252 of the determined bandwidths.

The function of the bandwidth management unit 105 is also achieved by the CPU 13 and the memory 12 illustrated in FIG. 2, for example. For example, various programs that achieve the function of the bandwidth management unit 105 are stored in the HDD 14. The CPU 13 reads the various programs from the HDD 14, loads the programs in the memory 12, and executes the processing that achieves the function of the bandwidth management unit 105.

The performance adjusting unit 252 adjusts the allocation rates of the respective types of the disks 203 of the respective volumes 232 in accordance with the allocation rates designated by the allocation rate management unit 102. The performance adjusting unit 252 adjusts the bandwidths of the respective volumes 232 in accordance with the instruction to adjust the bandwidths from the bandwidth management unit 105.

The following describes timing when the allocation rate management unit 102 performs the performance adjustment and timing when the bandwidth management unit 105 performs the performance adjustment.

The time taken to complete the performance adjustment by the QoS function is smaller than that of the performance adjustment by the automatic layering function. In the embodiment, the bandwidth management unit 105 thus performs the performance adjustment by the bandwidth adjusting using the QoS function, first. Thereafter, when the performance adjustment using the QoS function performed by the bandwidth management unit 105 reaches the limit, the allocation rate management unit 102 performs the performance adjustment by changing the allocation rates of the respective types of the disks 203 using the automatic layering function. The following describes the operation timing of the bandwidth management unit 105 and the allocation rate management unit 102 in detail with reference to FIG. 27. FIG. 27 is a schematic diagram illustrating the operation timing of the QoS function and the automatic layering function. The vertical axis represents the response time while the abscess axis represents time in FIG. 27.

The starting time on the abscess axis in FIG. 27 represents the start timing of the performance adjustment. When the performance adjustment starts, the bandwidth management unit 105 performs the performance adjustment using the QoS function. The bandwidth management unit 105 performs the performance adjustment until the limit of the performance adjustment using the QoS function. An interval P1 represents a range of response times that are reduced by the performance adjustment by the QoS function. The bandwidth management unit 105 performs the performance adjustment for a time T1, at the end of which the performance adjustment using the QoS function reaches the limit.

Thereafter, the bandwidth management unit 105 notifies the allocation rate management unit 102 of the completion of the performance adjustment.

The allocation rate management unit 102 compares the actual measured response time with the target response time and performs the performance adjustment by the automatic layering function when the actual measured response time has not reached the target response time. An interval P2 represents a range of the response times that are reduced by the performance adjustment by the automatic layering function. The allocation rate management unit 102 performs the performance adjustment by the automatic layering function for a time T2, at the end of which the response time reaches a performance target P3.

As described above, the storage management apparatus according to the embodiment performs the performance adjustment by the QoS function and the automatic layering function using the same performance evaluation indicator. When widening the width of the performance adjustment using both of the QoS function and the automatic layering function, a user can readily set the target performance. As a result, the user can perform the performance adjustment more flexibly and more effectively.

The performance adjustment by the automatic layering function is performed after the performance adjustment by the QoS function, thereby making it possible to increase the efficiency in the performance adjustment.

Modification

This modification differs from the fifth embodiment in that the performance adjustment by the automatic layering function is performed during the performance adjustment by the QoS function, and that the adjustment by the QoS function is performed again during the performance adjustment by the automatic layering function.

The following describes the operation timing of the bandwidth management unit 105 and the allocation rate management unit 102 according to the modification in detail with reference to FIG. 28. FIG. 28 is a schematic diagram illustrating another example of the operation timing of the QoS function and the automatic layering function. The vertical axis represents the response time while the abscess axis represents time in FIG. 28.

The bandwidth management unit 105 performs the performance adjustment by the QoS function for a time T3.

When the performance adjustment by the QoS function is performed a certain times, the allocation rate management unit 102 starts the performance adjustment by the automatic layering function and continues the performance adjustment for a time T4.

The bandwidth management unit 105 further performs the performance adjustment by the QoS function for a time T5 until the limit of the performance adjustment by the QoS function.

Thereafter, the allocation rate management unit 102 performs the performance adjustment by the automatic layering function for a time T6 until the performance reaches the performance target.

In the modification, the performance adjustment by the QoS function is performed one time between the implementations of the performance adjustment by the automatic layering function. The number of implementations of the performance adjustment by the QoS function is not limited to any specific number.

As described above, the storage management apparatus according to the modification performs the performance adjustment in such a manner that the performance adjustment by the QoS function is performed between the implementations of the performance adjustment by the automatic layering function. As a result, the time taken to achieve the target performance becomes longer but the bandwidth can be appropriately accommodated between the volumes by the QoS function, thereby making it possible to optimize the system as a whole.

[f] Sixth Embodiment

A sixth embodiment is described below. In the storage system according to the sixth embodiment, both of the QoS function and the automatic layering function are used, and when the performance adjustment by the automatic layering function is performed on a chunk basis, the performance adjustment is performed using an area different from that is used when both of the QoS function and the automatic layering function are performed. The operational management server 1 and the storage device 2 according to the embodiment are also illustrated in the block diagram of FIG.

26. The descriptions on the functions of the same components as the fifth embodiment are omitted in the following description.

When the performance adjustment on a chunk basis is designated, the allocation rate management unit 102 identifies the volume 232 to which the target performance value is set with reference to the volume table 142. When the performance adjustment is performed on a chunk basis, the allocation rate management unit 102 receives a policy setting including the maximum IOPS.

The allocation rate management unit 102 performs the performance adjustment on a chunk basis, in accordance with the received policy setting, using the volume 232 other than the volume 232 to which the target performance is set.

The allocation rate management unit 102 stores therein a setting of rates of use amounts of the respective disks 203 for volume designation and policy setting in order to prevent the free disk space of the disk 203 having a small capacity from being exhausted. The allocation rate management unit 102 performs the performance adjustment in accordance with the designated rates of the use amounts of the disks 203. For the allocation rates of the respective types of the disks 203 by the volume designation and the policy setting, initial values are preliminarily set. The values may be reset by the operator during the operation.

As a result, an effect of optimization on a chunk basis using the policy setting can also be obtained by the conventional automatic layering function. The time taken to complete the performance adjustment by both of the QoS function and the automatic layering function is preferably small and a disk area does not need to be provided for the optimization by the policy setting.

When the rates of the use amounts of the disks used in the performance adjustment by both of the QoS function and the automatic layering function are used, the allocation rate management unit 102 performs the following processing. When the chunk is transferred, the allocation rate management unit 102 multiplies the free disk spaces of the respective disks 203 by a designated rate and then checks the free disk space. When the free disk space is insufficient, the allocation rate management unit 102 does not transfer the chunk. As a result, the use amounts of the respective disks 203 can be uniformly reduced.

[g] Seventh Embodiment

A seventh embodiment is described below. In the storage system according to the seventh embodiment, both of the QoS function and the automatic layering function are used and the performance target is set as a target level. The operational management server 1 and the storage device 2 according to the embodiment are also illustrated in the block diagram of FIG. 26. The descriptions on the functions of the same components as the fifth embodiment are omitted in the following description.

The setting unit 101 receives an input of a high performance, a medium performance, or a low performance from the operation terminal 3 as the target performance level for each target set volume. The setting unit 101 writes the received performance levels into the setting table 141.

The allocation rate management unit 102 stores weights of the respective types of the disks 203 for each level as an allocation rate weight correspondence table 191, which is illustrated in FIG. 29, for example. FIG. 29 is a table illustrating an example of the allocation rate weight correspondence table The allocation rate management unit 102 acquires the target performance level from the setting table 141. The allocation rate management unit 102 calculates the target value corresponding to the target setting level. The allocation rate management unit 102 may preliminarily store therein the target values corresponding to the respective levels or calculate the target values using the respective pieces of volume performance information. The target value used by the allocation rate management unit 102 and the target value used by the bandwidth management unit 105 are the same.

When the target response time is smaller than the actual measured response time, and the limitation of the bandwidth is the largest as a result of the bandwidth adjusting by the bandwidth management unit 105 or no bandwidth limitation is performed, then the allocation rate management unit 102 performs the following processing. The allocation rate management unit 102 changes the allocation rates such that a larger number of the high speed disks are allocated to the target set volume than the other disks.

When the target response time is larger than the actual measured response time and the limitation of the bandwidth is the smallest as a result of the bandwidth adjusting by the bandwidth management unit 105, then the allocation rate management unit 102 performs the following processing. The allocation rate management unit 102 changes the allocation rates such that a larger number of the low speed disks are allocated to the target set volume than the other disks.

Specifically, the allocation rate management unit 102 performs the allocation according to the following manner. An exemplary case is described below in which the total capacity of the volumes 232 to which the high performance is set as the target is 100 GB, the total capacity of the volumes 232 to which the medium performance is set as the target is 200 GB, and the total capacity of the volumes 232 to which the low performance is set as the target is 300 GB.

The allocation rate management unit 102 calculates the whole capacity based on the weights of the respective types of disks 203 by summing values obtained by multiplying the capacities of the volumes 232 set to the respective levels by the respective values in the allocation rate weight correspondence table. For example, the whole capacity based on the weights of the high speed disk can be calculated as follows: 2×100 GB+1×200 GB+0.5×300 GB=550 GB.

The whole capacity based on the weights is allocated in accordance with the respective weights. The allocation rate management unit 102 calculates the capacity of the high speed disk allocated to the volume 232 to which the high performance is set as the target as follows: (100 GB×2×100 GB)/550 GB=36 GB. The allocation rate management unit 102 calculates the capacity of the high speed disk allocated to the volume 232 to which the medium performance is set as the target as follows: (100 GB×1×200 GB)/550 GB=36 GB. The allocation rate management unit 102 calculates the capacity of the high speed disks allocated to the volume 232 to which the low performance is set as the target as follows: (100 GB×0.5×300 GB)/550 GB=27 GB.

The allocation rate management unit 102 determines the allocation rates of the medium disk to the volumes 232 set to the respective levels in the same manner as described above. The allocation rate management unit 102 allocates the low speed disk to the balance in the volumes 232 set to the respective levels after the allocation of the high speed disk and the medium speed disk.

When the target response time fails to be achieved, the allocation rate management unit 102 determines the allocation rates in the manner described in the embodiments described above.

In the respective embodiments described above, the response time is mainly used as the performance indicator. The evaluation indicator is not limited to the response time. For example, the IOPS and the throughput may be used. In such a case, the storage management apparatus also has the same function and advantages effect.

The storage management apparatus, the performance adjusting method, and the performance adjusting program according to aspects of the invention have an advantageous effect of being capable of readily performing the performance adjustment in the automatic storage layering.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage management apparatus that manages a storage device including a plurality of types of storage units having different performances, the type being determined by a method of reading and writing data, the storage management apparatus comprising:
    a processor and a memory,
    the processor
        sets a target value of a performance to a storage area produced by using the different types of the storage units, the target value being a response time, input output per second (IOPS) information, or a throughput;
        produces an approximate expression for obtaining a predictive value of the performance of the storage area; and
        determines allocation rates of the respective types of the storage units included in the storage area such that the predictive value calculated by using the approximate expression gets closer to the target value based on the target value set, and
        instructs the storage device to reproduce the storage area in accordance with the determined allocation rates.

2. The storage management apparatus according to claim 1, wherein the processor obtains performances of the respective types of the storage units and an access distribution function that expresses frequencies of accesses to data stored in the storage units, and obtains the approximate expression based on the performances of the respective types of the storage units and the access distribution function.

3. The storage management apparatus according to claim 2, wherein the processor uses predetermined fixed values of the performances of the respective types of the storage units in the predetermined access distribution function.

4. The storage management apparatus according to claim 2, wherein the processor acquires measured values of the performances of the storage units and the access frequencies, and calculates the access distribution functions of the respective types of the storage units using the measured values of the access frequencies.

5. The storage management apparatus according to claim 1, wherein
    the processor measures the performance of the storage area and changes the allocation rates such that the measured value gets close to the target value.

6. The storage management apparatus according to claim 1, wherein the processor adjusts a bandwidth of the storage area based on the target value.

7. The storage management apparatus according to claim 6, wherein, while performance adjustment of the storage area is performed one time, the processor changes the allocation rates of the respective types of the storage units after the processor adjusts the bandwidth.

8. The storage management apparatus according to claim 6, wherein,
    while performance adjustment of the storage area is performed one time, the processor repeats the adjustment of the bandwidth and the change of the allocation rates of the respective types of the storage units to cause the performance of the storage area to get close to the target value.

9. The storage management apparatus according to claim 1, wherein the processor
    receives an input designating a performance level of the storage area and sets the performance level as the target value of the performance of the storage area, and
    obtains the target value of the performance in inputting data to and outputting data from the storage area in accordance with the performance level that has been input.

10. The storage management apparatus according to claim 1, wherein the processor preliminarily stores therein adjusting values of the respective performance levels for the respective types, determines the allocation rates of the respective types of the storage units based on the adjusting values, and determines the allocation rates based on the target value when the performance of the storage area produced in accordance with the determined allocation rates fails to reach the target value.

11. A performance adjusting method of a storage device that includes a plurality of types of storage units having different performances, the type being determined by a method of reading and writing data, the performance adjusting method comprising:
    setting a target value of a performance to a storage area produced by using the different types of the storage units, the target value being a response time, input output per second (IOPS) information, or a throughput;
    producing an approximate expression for obtaining a predictive value of the performance of the storage area;
    determining allocation rates of the respective types of the storage units included in the storage area such that the predictive value calculated by using the approximate expression gets closer to the target value based on the target value; and
    instructing the storage device to reproduce the storage area in accordance with the determined allocation rates.

12. A non-transitory computer-readable recording medium having stored therein a performance adjusting program of a storage device that includes a plurality of types of storage units having different performances, the type being determined by a method of reading and writing data, the performance adjusting program causing a computer to execute a process comprising:

setting a target value of a performance to a storage area produced by using the different types of the storage units, the target value being a response time, input output per second (IOPS) information, or a throughput;

producing an approximate expression for obtaining a predictive value of the performance of the storage area;

determining allocation rates of the respective types of the storage units included in the storage area such that the predictive value calculated by using the approximate expression gets closer to the target value based on the target value; and instructing the storage device to reproduce the storage area in accordance with the determined allocation rates.

13. The storage management apparatus according to claim 1, wherein the processor determines allocation rates which indicates a number of each of the storage units which has the respective types.

14. The storage management apparatus according to claim 1, wherein the storage units includes a first type storage unit, a second type storage unit, and a third type storage unit; and the processor determines allocation rates which indicates a number of the first type storage units, a number of the second type storage units, and the third type storage units.

* * * * *